US012755662B2

(12) United States Patent
Tanaka

(10) Patent No.: US 12,755,662 B2
(45) Date of Patent: Oct. 6, 2026

(54) DRIVER AND ELECTRO-OPTICAL APPARATUS

(71) Applicant: SEIKO EPSON CORPORATION, Tokyo (JP)

(72) Inventor: Kazuaki Tanaka, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 19/058,888

(22) Filed: Feb. 20, 2025

(65) Prior Publication Data

US 2025/0273109 A1 Aug. 28, 2025

(30) Foreign Application Priority Data

Feb. 22, 2024 (JP) ................................ 2024-025273

(51) Int. Cl.
*G09G 3/10* (2006.01)
*G09G 3/18* (2006.01)

(52) U.S. Cl.
CPC ......... *G09G 3/18* (2013.01); *G09G 2320/066* (2013.01); *G09G 2320/0686* (2013.01); *G09G 2380/10* (2013.01)

(58) Field of Classification Search
None
See application file for complete search history.

(56) References Cited

U.S. PATENT DOCUMENTS

2021/0005129 A1* 1/2021 Kondo ................ G09G 3/2014
2024/0038124 A1 2/2024 Tanaka

FOREIGN PATENT DOCUMENTS

JP H09-269752 A 10/1997

* cited by examiner

*Primary Examiner* — Joseph R Haley
(74) *Attorney, Agent, or Firm* — Rankin, Hill & Clark LLP

(57) ABSTRACT

A driver configured to drive a liquid crystal panel includes a first terminal to an n-th terminal electrically coupled to segment electrodes of the liquid crystal panel, and a first segment driving circuit to an n-th segment driving circuit configured to output a static-driving or duty-driving drive signal to the first terminal to the n-th terminal. The first segment driving circuit to the n-th segment driving circuit are each configured to output the static-driving drive signal when the static driving is set, and output the duty-driving drive signal when the duty driving is set.

10 Claims, 15 Drawing Sheets

FIG. 12

| D7 | D6 | D5 | D4 | D3 | D2 | D1 | D0 | CONTENT |
|---|---|---|---|---|---|---|---|---|
| P17 | P16 | P15 | P14 | P13 | P12 | P11 | P10 | DATA FOR SEG1 |
| P27 | P26 | P25 | P24 | P23 | P22 | P21 | P20 | DATA FOR SEG2 |
| P37 | P36 | P35 | P34 | P33 | P32 | P31 | P30 | DATA FOR SEG3 |
| P47 | P46 | P45 | P44 | P43 | P42 | P41 | P40 | DATA FOR SEG4 |
| P57 | P56 | P55 | P54 | P53 | P52 | P51 | P50 | DATA FOR SEG5 |
| P67 | P66 | P65 | P64 | P63 | P62 | P61 | P60 | DATA FOR SEG6 |
| P77 | P76 | P75 | P74 | P73 | P72 | P71 | P70 | DATA FOR SEG7 |
| P87 | P86 | P85 | P84 | P83 | P82 | P81 | P80 | DATA FOR SEG8 |
| P97 | P96 | P95 | P94 | P93 | P92 | P91 | P90 | DATA FOR SEG9 |
| P107 | P106 | P105 | P104 | P103 | P102 | P101 | P100 | DATA FOR SEG10 |
| P117 | P116 | P115 | P114 | P113 | P112 | P111 | P110 | DATA FOR SEG11 |
| P127 | P126 | P125 | P124 | P123 | P122 | P121 | P120 | DATA FOR SEG12 |
| P137 | P136 | P135 | P134 | P133 | P132 | P131 | P130 | DATA FOR SEG13 |
| P147 | P146 | P145 | P144 | P143 | P142 | P141 | P140 | DATA FOR SEG14 |
| P157 | P156 | P155 | P154 | P153 | P152 | P151 | P150 | DATA FOR SEG15 |
| P167 | P166 | P165 | P164 | P163 | P162 | P161 | P160 | DATA FOR SEG16 |
| P177 | P176 | P175 | P174 | P173 | P172 | P171 | P170 | DATA FOR SEG17 |
| P187 | P186 | P185 | P184 | P183 | P182 | P181 | P180 | DATA FOR SEG18 |
| P197 | P196 | P195 | P194 | P193 | P192 | P191 | P190 | DATA FOR SEG19 |
| P207 | P206 | P205 | P204 | P203 | P202 | P201 | P200 | DATA FOR SEG20 |
| ⋮ | ⋮ | ⋮ | ⋮ | ⋮ | ⋮ | ⋮ | ⋮ | ⋮ |

| D7 | D6 | D5 | D4 | D3 | D2 | D1 | D0 |
|---|---|---|---|---|---|---|---|
| 0 | 0 | 0 | 0 | 0 | 0 | 0 | 0 |

| RAM DATA | | | | GRADATION LEVEL |
|---|---|---|---|---|
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 0 | 1 | 0 | 10 |
| 1 | 0 | 1 | 1 | 11 |
| 1 | 1 | 0 | 0 | 12 |
| 1 | 1 | 0 | 1 | 13 |
| 1 | 1 | 1 | 0 | 14 |
| 1 | 1 | 1 | 1 | 15 |

DRIVER AND ELECTRO-OPTICAL APPARATUS

The present application is based on, and claims priority from JP Application Serial Number 2024-025273, filed Feb. 22, 2024, the disclosure of which is hereby incorporated by reference herein in its entirety.

BACKGROUND

1. Technical Field

The present disclosure relates to a driver, an electro-optical apparatus, and the like.

2. Related Art

JP-A-9-269752 discloses a liquid crystal driving circuit that has an output potential for duty driving and an output potential for static driving and outputs a selected one of the output potentials via a liquid crystal driving output terminal. In the related art, for example, a signal for duty driving is output in first and second frames via the liquid crystal driving output terminal, and a signal for static driving is output in a third frame via the liquid crystal driving output terminal. The drive signals output via the liquid crystal drive output terminal are thus switched from one to the other on a frame basis.

JP-A-9-269752 is an example of the related art.

JP-A-9-269752 and other related art, however, have not proposed a method for switching the driving mode for each terminal of a driver that drives the liquid crystal panel.

SUMMARY

An aspect of the present disclosure relates to a driver configured to drive a liquid crystal panel, the driver including: a first terminal to an n-th terminal electrically coupled to segment electrodes of the liquid crystal panel; and a first segment driving circuit to an n-th segment driving circuit configured to output a static-driving or duty-driving drive signal to the first terminal to the n-th terminal, the first segment driving circuit to the n-th segment driving circuit each configured to output the static-driving drive signal when the static driving is set, and output the duty-driving drive signal when the duty driving is set.

Another aspect of the present disclosure relates to an electro-optical apparatus including the driver described above and the liquid crystal panel.

BRIEF DESCRIPTION OF THE DRAWINGS

FIG. 12 shows an example of a format of data including display data and selection data.

DESCRIPTION OF EMBODIMENTS

A preferred embodiment of the present disclosure will be described below in detail. It is not intended that the present embodiment described below unduly limits the contents described in the claims, and that all configurations described in the present embodiment are not necessarily essential configuration requirements.

1. Example of Configuration of Driver

Figure 1:
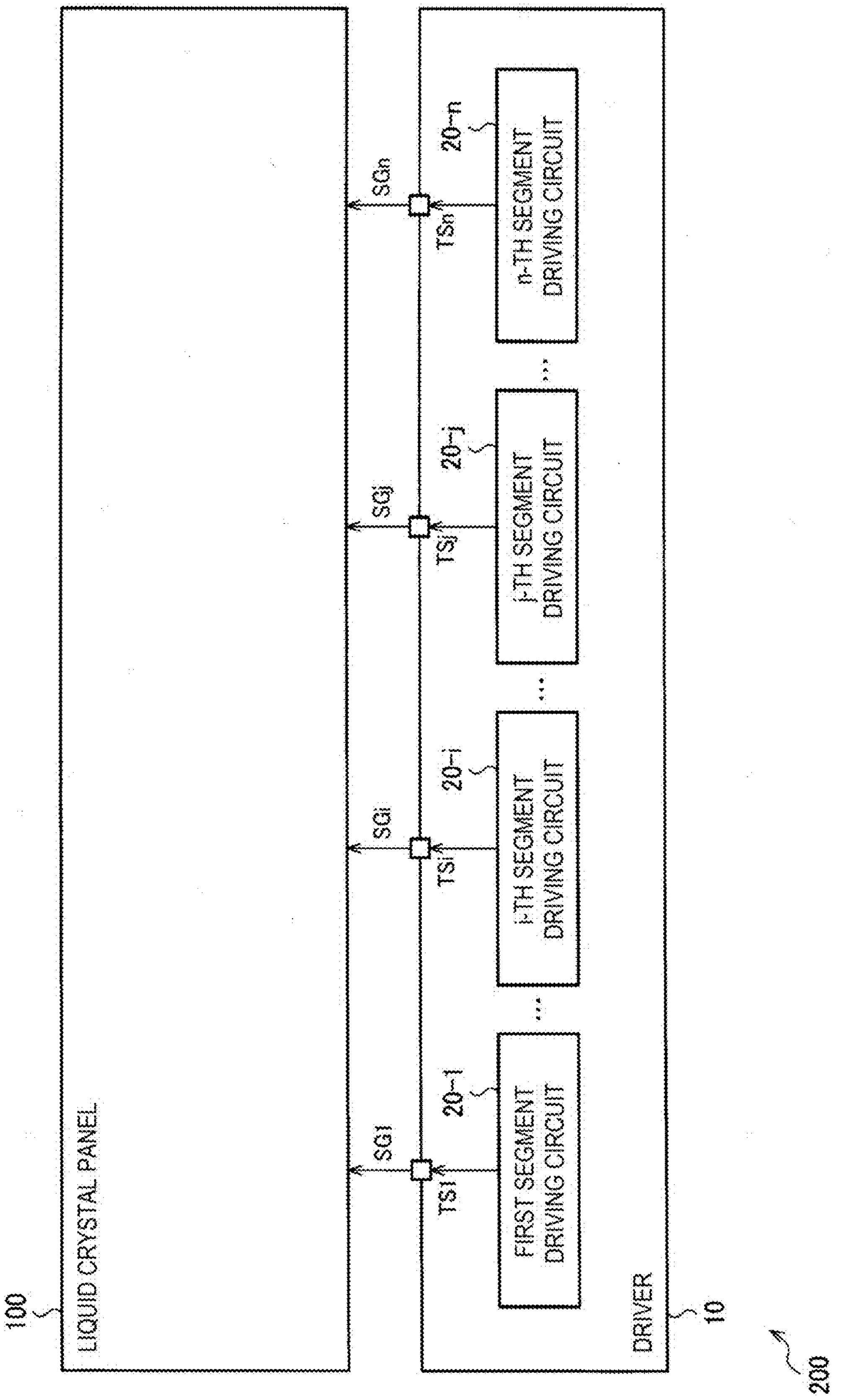
FIG. 1 shows an example of the configurations of a driver and an electro-optical apparatus according to an embodiment of the present disclosure.

FIG. 1 shows an example of the configuration of a driver 10 according to the present embodiment. The driver 10 is a circuit apparatus that drives a liquid crystal panel 100. The liquid crystal panel 100 is provided with multiple segment electrodes. The driver 10 includes a first terminal TS1 to an n-th terminal TSn and a first segment driving circuit 20-1 to an n-th segment driving circuit **20-*n*. For example, n is an integer greater than or equal to two. That is, the driver 10 includes multiple terminals and multiple segment driving circuits, and the liquid crystal panel 100** includes multiple segment electrodes.

The electro-optical apparatus 200 is, for example, a display apparatus that displays an image based on image data. The electro-optical apparatus 200 is, for example, an in-vehicle display instrument such as a cluster display that is an instrument panel display, a center information display, a head-up display that displays a virtual image in a user's field of view, or an electronic mirror. The in-vehicle display instrument is a display apparatus incorporated in a motor vehicle such as a four-wheel or two-wheel motor vehicle. The electro-optical apparatus 200 may instead a be display apparatus incorporated in a moving object other than a car, such as a ship, a head mounted display apparatus called an HMD, a television apparatus, or a display of an information processing apparatus.

The liquid crystal panel 100 is an electro-optical panel and is a display panel. The liquid crystal panel 100 is a panel driven, for example, in a static driving mode or a duty driving mode. Specifically, the liquid crystal panel 100 includes a first glass substrate, a second glass substrate, and a liquid crystal material. The liquid crystal material is encapsulated between the first glass substrate and the second glass substrate. The segment electrodes are provided at the first glass substrate, and a common electrode is provided at the second glass substrate. The driver 10 outputs a drive signal to a segment electrode. The driver 10 may output a common signal to the common electrode. A voltage difference between the drive signal output to the segment electrode and the common signal is applied to the liquid crystal material between the segment electrode and the common electrode. The segment electrodes and the common electrode are transparent electrodes, and are made, for example, of ITO (indium tin oxide). The liquid crystal panel 100 is also provided with a backlight as will be described later. The backlight may, for example, be an edge backlight. Specifically, the backlight includes a light source, and a light guide plate that is provided, for example, at the rear surface of the liquid crystal panel 100 and guides the light from the light source.

The liquid crystal panel 100 includes the multiple segment electrodes (segment electrode group), and the first terminal TS1 to the n-th terminal TSn of the driver 10 are each electrically coupled to a corresponding one of the multiple segment electrodes. Examples of the segment electrodes may include a segment electrode for displaying warning light, and a segment electrode used to display a displayed object other than warning light. The first terminal TS1 to the n-th terminal TSn may each be electrically coupled to one or more segment electrodes of the segment electrode group of the liquid crystal panel 100.

Figure 2:
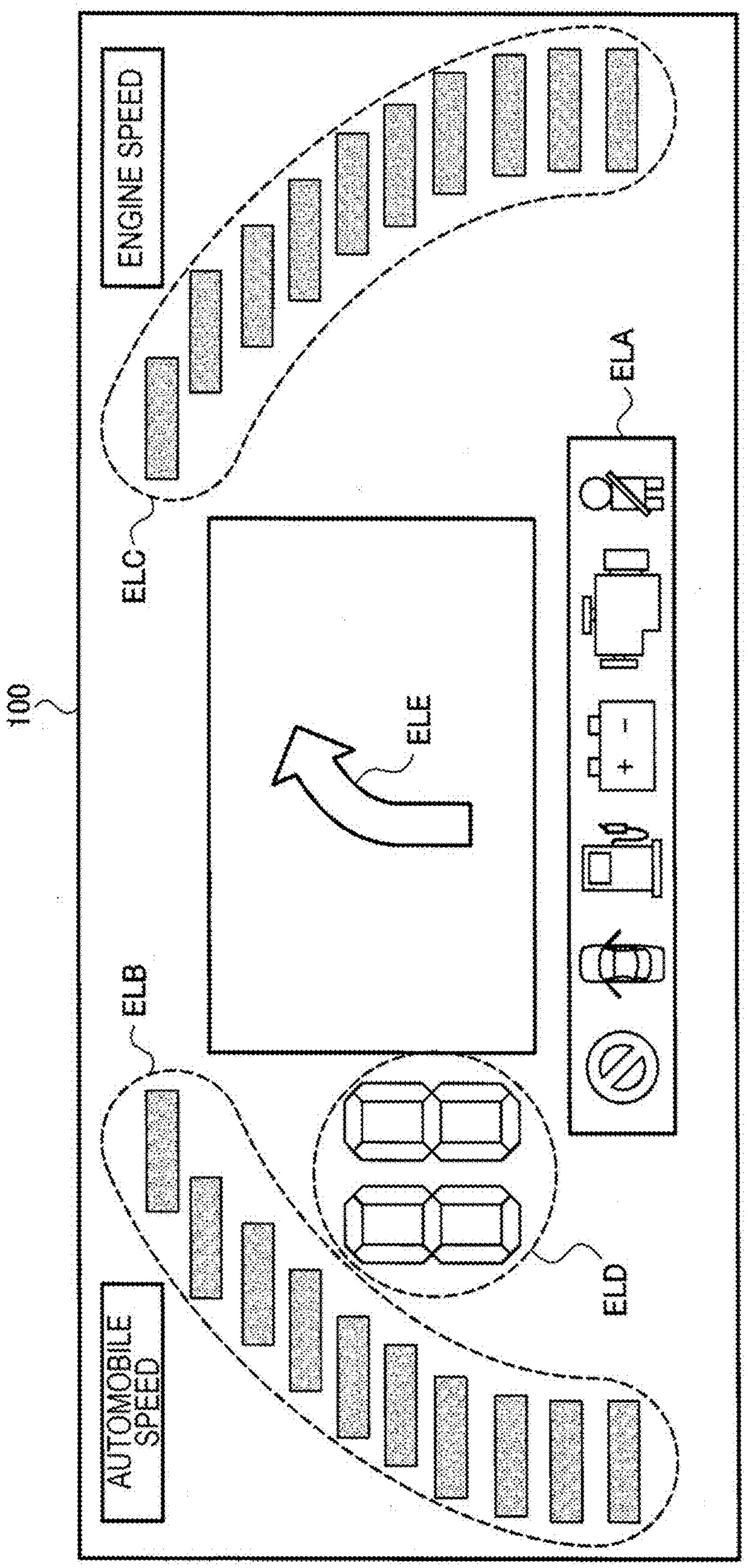
FIG. 2 shows an example of segment electrodes of a liquid crystal panel.

FIG. 2 shows an example of the segment electrodes of the liquid crystal panel 100. FIG. 2 shows an example of the liquid crystal panel 100 used in an instrument panel of an automobile. ELA in FIG. 2 is an example of the segment electrode for displaying warning light. The warning light is, for example, a displayed object that emits light to provide a warning when some problem or failure occurs in an automobile or the like or when a user such as a driver performs an inappropriate operation. Specifically, ELA in FIG. 2 is a segment electrode for displaying warning light relating to whether a passenger has buckled the seat belt, engine abnormality, battery abnormality, the amount of remaining gasoline, and whether a door is open or closed. The warning light is displayed in the form of an icon, a symbol, a character, or the like indicating a warning. ELB, ELC, ELD, and ELE in FIG. 2 are each a segment electrode for displaying a displayed object other than warning light. The displayed object other than warning light is, for example, a displayed object for conveying some kind of information to the user such as a driver, for example, by turning on and off the displayed object or using gradation display. For example, ELB is a segment electrode for a displayed object that displays the speed of the automobile, and ELC is a segment electrode for a displayed object that displays the engine speed. Gradation display is so performed on each of ELB and ELC, for example, that a region where the automobile speed or the engine speed is lower than or equal to the current automobile speed or the engine speed has a denser gradation, and that a region where the automobile speed or the engine speed is higher than the current automobile speed or the engine speed has a paler gradation. ELD is a segment electrode for eight-segment display, and ELE is a segment electrode for a displayed guiding object such as an arrow in simple navigation. Note that the segment electrode for warning light and the segment electrodes for displayed objects other than warning light are not limited to those in FIG. 2, and segment electrodes having various shapes and forms are conceivable.

The driver 10 is, for example, a circuit apparatus called an integrated circuit (IC). For example, the driver 10 is an IC manufactured in semiconductor manufacturing processes, is a semiconductor chip in which circuit elements are formed on a semiconductor substrate, and is a display driver that displays an image, for example, on the liquid crystal panel 100. The driver 10, which is a circuit apparatus, is mounted, for example, on a glass substrate of the liquid crystal panel 100. For example, the driver 10 is mounted on the first glass substrate, at which the segment electrodes are provided. Instead, the driver 10 may be mounted on a circuit substrate, and the circuit substrate and the liquid crystal panel 100 may be coupled to each other via a flexible substrate.

The driver 10 in the present embodiment, which drives the liquid crystal panel 100, includes the first terminal TS1 to the n-th terminal TSn and the first segment driving circuit 20-1 to the n-th segment driving circuit 20-*n*. Note that the driver 10 may include a data storage circuit, a common driving circuit, and the like, as will be described later.

The first terminal TS1 to the n-th terminal TSn are each electrically coupled to a corresponding segment electrode of the liquid crystal panel 100. The terminals may each be coupled to one or more of the segment electrodes. For example, the first terminal TS1 to the n-th terminal TSn are electrically coupled to the multiple segment electrodes via segment lines, input terminals, and the like of the liquid crystal panel 100. The first terminal TS1 to the n-th terminal TSn of the driver 10 are, for example, pads of the driver 10, which is a circuit apparatus. For example, in a pad region, a metal layer is exposed through a passivation film, which is an insulating layer, and the exposed metal layer constitutes the pad, which is a terminal of the driver 10. The terminals may be external coupling terminals of a package that houses the driver 10. The term “coupling” in the present embodiment means electrical coupling. The term “electrical coupling” means coupling that allows transmission 41 an electric signal and transmission of information carried by the electric signal. The electrical coupling may be coupling, for example, via a passive element.

The first segment driving circuit 20-1 to the n-th segment driving circuit 20-*n* output drive signals SG1 to SGn to the first terminal TS1 to the n-th terminal TSn. The drive signals SG1 to SGn are, for example, static-driving or duty-driving drive signals. For example, an i-th segment driving circuit 20-*i* of the first segment driving circuit 20-1 to the n-th segment driving circuit 20-*n* outputs a drive signal SGi to an i-th terminal TSi. A j-th segment driving circuit 20-*j* outputs a drive signal SGj to a j-th terminal TSj. In the above description, i and j are integers that satisfy, for example, $1 \leq i < j \leq n$.

In the present embodiment, the first segment driving circuit 20-1 to the n-th segment driving circuit 20-*n* each output the static-driving drive signal when the static driving (static driving mode) is set. The segment driving circuits each output the duty-driving drive signal when the duty driving (duty driving mode) is set. For example, it is assumed that the i-th segment driving circuit 20-*i* has been set to perform the static driving, and the j-th segment driving circuit 20-*j* has been set to perform the duty driving. In this case, the i-th segment driving circuit 20-*i* outputs the static-driving drive signal SGi to the i-th terminal TSi, and the segment electrode coupled to the i-th terminal TSi is thus driven in the static driving mode. The j-th segment driving circuit 20-*j* outputs the duty-driving drive signal SGj the j-th terminal TSj, and the segment electrode coupled to the j-th terminal TSj is thus driven in the duty driving mode. In the duty driving mode, multiple segment electrodes are coupled to the j-th terminal TSj. For example, when j=i+1, the i-th terminal TSi and the j-th terminal TSj are disposed, for example, adjacent to each other along a side of the driver 10. The static-driving drive signal SGi is output via the i-th terminal TSi, and the duty-driving drive signal SGj is output via the j-th terminal TSj adjacent to the i-th terminal TSi. A (j+1)-th terminal TSj+1 adjacent to the j-th terminal TSj outputs, for example, the static-driving drive signal or the duty-driving drive signal. The multiple segment driving circuits can each thus be individually set to perform the static driving or the duty driving, and the static-driving drive signal or the duty-driving drive signal can be output via each of the multiple terminals.

Note in the present embodiment that each of the segment driving circuits, which is one of the first segment driving circuit 20-1 to the n-th segment driving circuit 20-*n*, is referred to as a segment driving circuit 20 as appropriate. Furthermore, each of the terminals, which is one of the first terminal TS1 to the n-th terminal TSn, is referred to as a terminal TS as appropriate.

According to the present embodiment, when set to perform the static driving, the segment driving circuit 20 outputs the static-driving drive signal to the terminal TS. The segment electrode coupled to the terminal TS is thus driven in the static driving mode. On the other hand, when set to perform the duty driving, the segment driving circuit 20 outputs the duty-driving drive signal to the terminal TS. The segment electrode coupled to the terminal TS is thus driven in the duty driving mode. Setting the segment driving circuit 20 to perform the static driving means setting the segment driving circuit 20 to output the static-driving drive signal. Setting the segment driving circuit 20 to perform the duty driving means setting the segment driving circuit 20 to output the duty-driving drive signal.

In the static driving, for example, the segment electrodes are separately driven. For example, when the liquid crystal panel 100 is provided with multiple segment electrodes, the segment driving circuits, which are each the segment driving circuit 20, each output a drive signal to the corresponding one of the multiple segment electrodes. According to the static driving, in which the segment electrodes are driven separately as described above, the difference in luminance between the light-on state (displayed-object-on state) and the light-off state (displayed-object-off state) can be increased, so that a displayed object such as warning light corresponding to a segment electrode can be displayed at high contrast.

On the other hand, the duty driving is dynamic driving, and is specifically driving called passive matrix driving. In the dynamic driving, multiple segment electrodes are driven by a common drive signal. For example, the segment driving circuit 20 outputs a common drive signal to the multiple segment electrodes provided at the liquid crystal panel 100 to drive the multiple segment electrodes. For example, a segment line coupled to all the multiple segment electrodes is wired through the liquid crystal panel 100, and the drive signal from the segment driving circuit 20 is input to the segment line coupled to all the multiple segment electrodes. The duty driving performed by the segment driving circuit 20 includes various types of duty driving such as ½, ⅓, ¼, ⅕, and ⅙ duty driving. The duty driving is, for example, driving based on voltage averaging.

For example, it is desirable that the segment electrode for displaying warning light described with reference to FIG. 2 be displayed at high contrast. It is therefore desirable that the segment driving circuit 20 that drives the segment electrode for displaying warning light is set to perform the static driving. The term "high contrast" used herein, for example, means that there is a large difference in luminance between the light-on state and the light-off state. For example, a drive signal is so output to a segment electrode that there is a large difference in luminance between the state in which warning light displayed by the segment electrode is on and the state in which the warning light is off. For example, in normally white display, the light-on state is a state in which the displayed object is displayed in black, and the light-off state is a state in which the displayed object is displayed in white. In this case, the driving is therefore so performed that the difference in luminance between the warning light displayed in black and the warning light displayed in white is greater than the difference in luminance between a displayed object other than the warning light displayed in black and the displayed object other than the warning light displayed in white. On the other hand, in normally black display, the light-on state is the state in which the displayed object is displayed in white, and the light-off state is the state in which the displayed object is displayed in black. In this case, the driving is therefore so performed that the difference in luminance between the warning light displayed in white and the warning light displayed in black is greater than the difference in luminance between a displayed object other than the warning light displayed in white and the displayed object other than the warning t displayed in black. Displaying the warning light at contrast higher than the contrast of other displayed objects as described above increases the difference in luminance between the light-on state and the light-off state, so that the visibility of the warning light can be enhanced. Note that the light-on state may be called a displayed-object-on state, and the light-off state may be called a displayed-object-off state.

In the static driving, gradation display can be performed by performing pulse width modulation (PWM) driving or pulse amplitude modulation (PAM) driving. It is therefore desirable that the segment driving circuit 20 that drives a segment electrode that requires gradation display is set to perform the static driving. Gradation display can thus be performed on a displayed object corresponding to the segment electrode.

On the other hand, in the duty driving, the segment driving circuit 20 can output a drive signal to the segment line coupled to all multiple segment electrodes to display a displayed object corresponding to the multiple segment electrodes. The segment driving circuit 20 can therefore output a drive signal to one terminal of the driver 10 to display a displayed object corresponding to all the multiple segment electrodes coupled to the segment line coupled to the one terminal. Therefore, the number of terminals of the driver 10 can be reduced, or the segment line can be readily wired in the liquid crystal panel 100.

Figure 3:
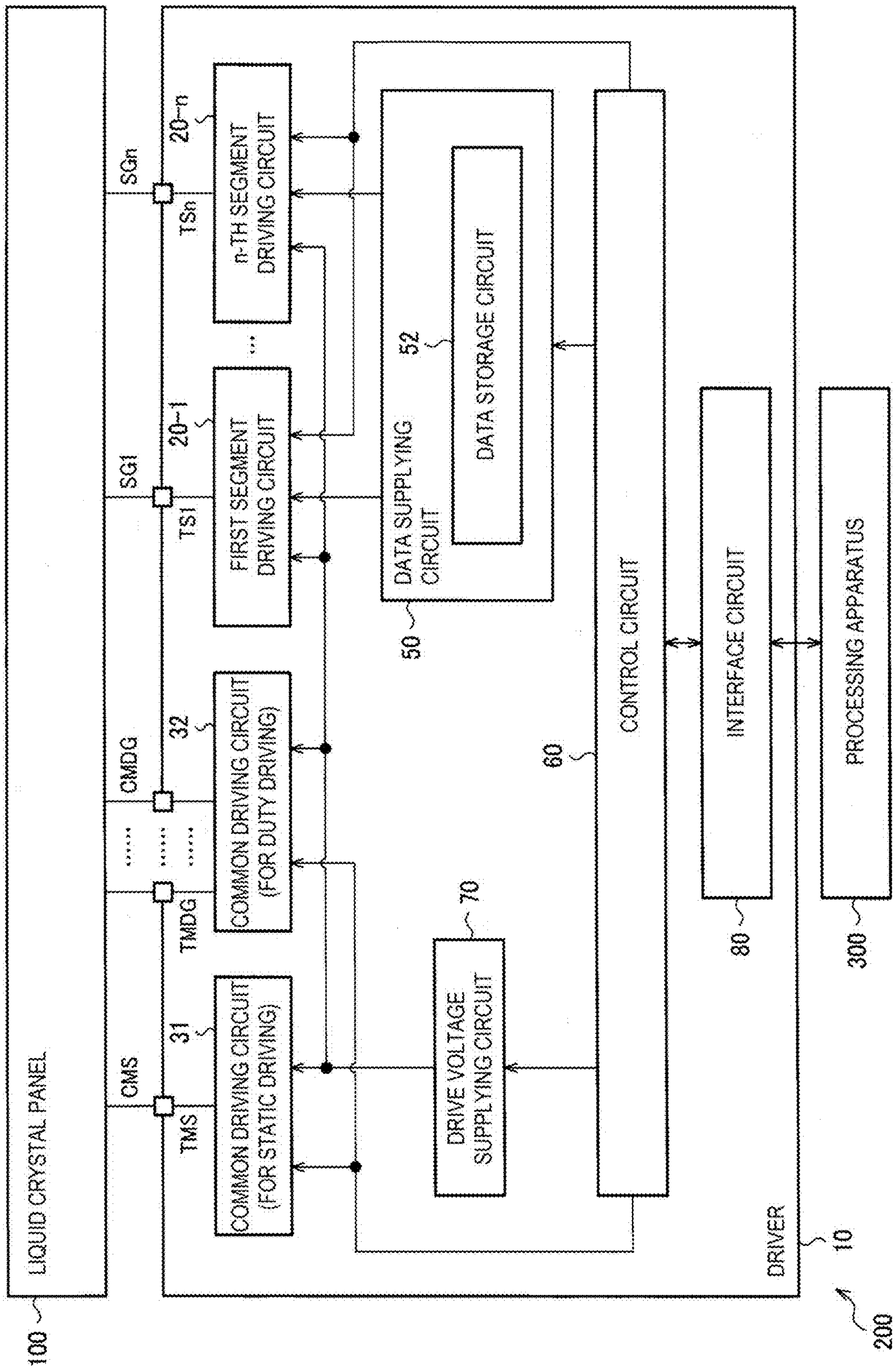
FIG. 3 shows an example of detailed configurations of the driver and the electro-optical apparatus according to the present embodiment.

FIG. 3 shows an example of detailed configurations of the driver 10 and the electro-optical apparatus 200 according to the present embodiment. In FIG. 3, the driver 10 includes the first segment driving circuit 20-1 to the n-th segment driving circuit 20-*n*, common driving circuits 31 and 32, the first terminals TS1 to the n-th terminal TSn, a common terminal TMS, and a common terminal group TMDG. The first terminal TS1 to the n-th terminal TSn are segment terminals coupled to segment electrodes. The common driving circuit 31 is a common driving circuit for static driving, and the common driving circuit 32 is a common driving circuit for duty driving. The common terminal TMS is a common terminal for static driving, and the common terminal group TMDG is a terminal group including multiple common terminals for duty driving. The driver 10 may further include a data supplying circuit 50, a control circuit 60, a drive voltage supplying circuit 70, and an interface circuit 80. The data supplying circuit 50 includes a data storage circuit 52. Note that the driver 10 and the electro-optical apparatus 200 are not necessarily configured as shown in FIG. 3, and various modifications are conceivable, for example, some of the elements may be omitted from the driver 10 and the electro-optical apparatus 200, or other elements may be added thereto.

The first terminal TS1 to the n-th terminal TSn are electrically coupled to the segment electrodes of the liquid crystal panel 100, and the first segment driving circuit 20-1 to the n-th segment driving circuit 20-*n* output drive signals to the first terminal TS1 to the n-th terminal TSn. The first segment driving circuit 20-1 to the n-th segment driving circuit 20-*n* each output the static-driving drive signal when the static driving is set, and outputs the duty-driving drive signal when the duty driving is set. For example, the segment driving circuits each output the static-driving drive signal when the static driving is selected based on selection data, which will be described later, and output the duty-driving drive signal when the duty driving is selected based on the selection data.

The common driving circuit for static driving 31 outputs a static-driving common signal CMS. For example, the common driving circuit 31 outputs the static-driving common signal CMS to the common terminal TMS for static driving to drive the common electrode for static driving.

The common driving circuit 32 for duty driving outputs a duty-driving common signal group CMDG. For example, the common driving circuit 32 outputs the common-driving common signal group CMDG to the common terminal group TMDG for duty driving to drive a common electrode group for common driving. The duty-driving common signal group CMDG includes multiple common signals: two common signals used in the ½ duty driving; and four common signals in used the ¼ duty driving, the two types of which duty driving being described later. The common terminal group TMDG for duty driving includes multiple common terminals: two common terminals used in the ½ duty driving; and four common terminals used in the ¼ duty driving.

The first terminal TS1 to the n-th terminal TSn are terminals via which the drive signals SG1 to SGn are output, and are realized, for example, by some of the pads of the driver 10. The common terminal TMS is a terminal via which the common signal CMS for static driving is output, and the common terminal group TMDG is a terminal group via which the common signal group CMDG for duty driving is output. The common terminal TMS and the common terminal group TMDG are realized, for example, by some of the pads of the driver 10.

The drive voltage supplying circuit 70 supplies a drive voltage that is a drive power supply voltage for driving the liquid crystal panel 100 to the first segment driving circuit 20-1 to the n-th segment driving circuit 20-*n* and the common driving circuits 31 and 32. The first segment driving circuit 20-1 to the n-th segment driving circuit 20-*n* generate the drive signals SG1 to SGn, for example, by selecting drive voltages for segment electrodes based on display data, and output the generated drive signals. The common driving circuits 31 and 32 generate the common signal CMS and the common signal group CMDG, for example, by selecting a drive voltage for the common electrode, for example, under the control of the control circuit 60, and output the generated signals. The polarity of the common signals CMS and CMDG is reversed, for example, on a frame basis.

The data supplying circuit 50 is a circuit that supplies data to each of the segment driving circuits. For example, the data supplying circuit 50 supplies the display data, and the selection data, based on which the static driving or the duty driving is selected, to each of the first segment driving circuit 20-1 to the n-th segment driving circuit 20-*n*. For example, the display data and the selection data are stored in association with the segment electrodes or the terminals TS1 to TSn. For example, the data storage circuit 52 provided in the data supplying circuit 50 stores the display data and the selection data in association with the segment electrodes or the terminals. The data supplying circuit 50 then supplies the segment electrodes or the segment driving circuits corresponding to the terminals with the display data, based on which each of the segment electrodes is displayed, and the selection data, based on which the static driving mode or the duty driving is selected to drive the segment electrode. The driving selected based on the selection data thus allows a segment electrode corresponding to each of the terminals to be driven based on the display data.

The data storage circuit 52 is a circuit that stores data including the display data and the selection data, and can be realized, for example, by a memory such as a RAM, or a flip-flop circuit. The data storage circuit 52 stores the display data on displayed objects to be displayed by the liquid crystal panel 100, and the selection data, based on which the static driving or the duty driving is selected. The display data is, for example, on/off data or gradation data based on which a displayed object corresponding to a segment electrode is displayed. The display data and the selection data are received, for example, from a processing apparatus 300 via the interface circuit 80 and stored in the data storage circuit 52. Note that the selection data, based on which the static driving or the duty driving is selected, may be stored, for example, in a nonvolatile memory provided in the driver 10 and transferred from the nonvolatile memory to the data supplying circuit 50 or the data storage circuit 52.

The control circuit 60 is, for example, a logic circuit that operates based on a clock signal from an oscillation circuit that is not shown. The control circuit 60 can be realized, for example, by an application specific integrated circuit (ASIC) using an automatic wiring technology, such as a gate array, or a processor such as a CPU. The control circuit 60 performs display timing control, or setting the operation of the driver 10, and the like. Specifically, the control circuit 60 writes the display data, the selection data, various setting data, command data, and the like received by the interface circuit 80 to the data storage circuit 52 realized, for example, by a RAM.

The interface circuit 80 is a circuit that serves as an interface with the external processing apparatus 300, and handles communication between the processing apparatus 300 and the driver 10. For example, the interface circuit 80 receives the command data, the display data, and other various data from the processing apparatus 300. The interface circuit 80 can be realized, for example, by a serial interface circuit based, for example, on the inter-integrated-circuit (I2C) protocol or the serial peripheral interface (SPI) protocol.

The processing apparatus 300 is, for example, a host apparatus for the driver 10, and is realized, for example, by a processor or a display controller. The processor is, for example, a CPU, a microcomputer. Note that the processing apparatus 300 may be a circuit apparatus configured with multiple circuit parts. For example, the processing apparatus 300 may be an electronic control unit (ECU) in an in-vehicle electronic instrument.

Figure 4:
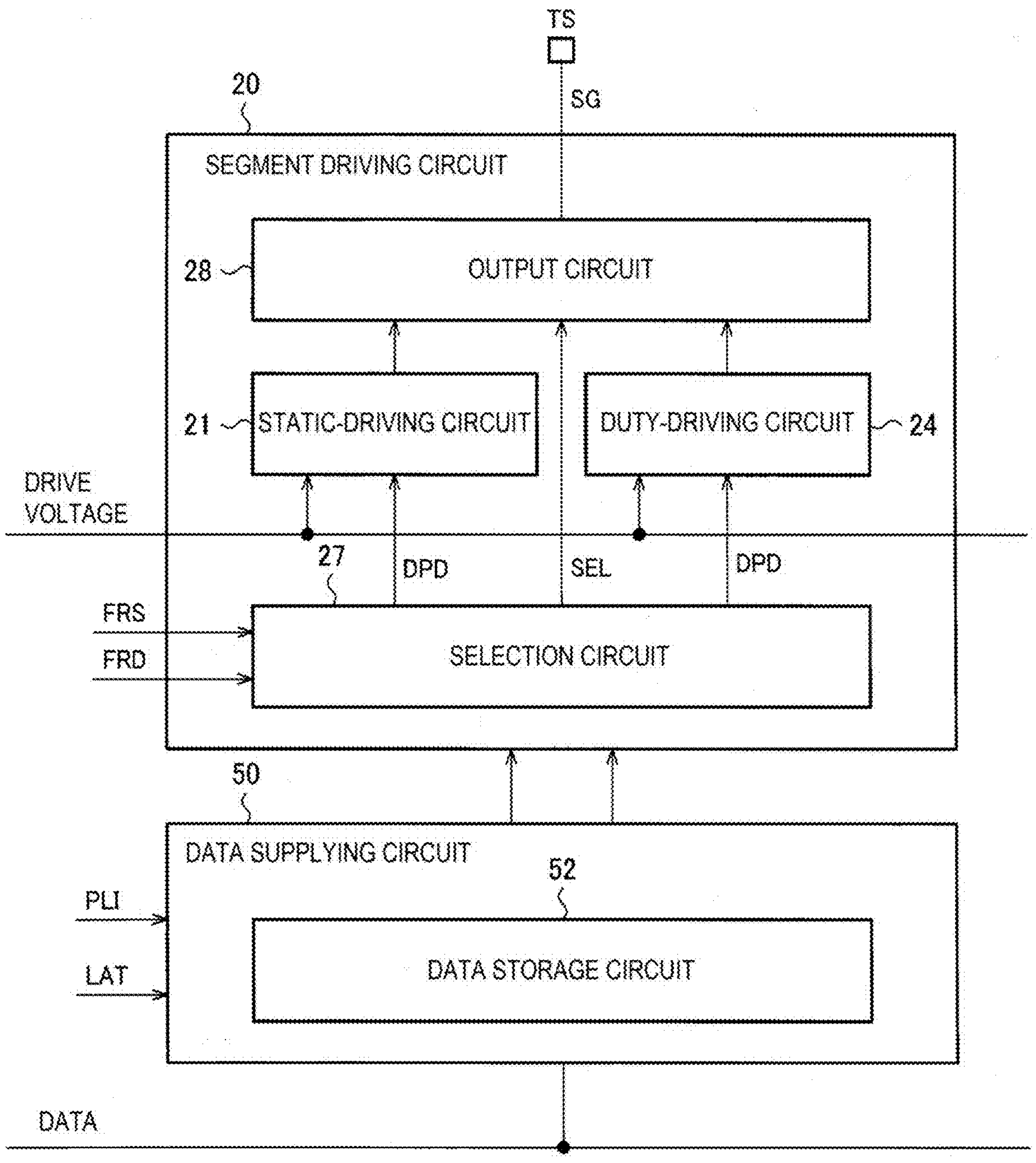
FIG. 4 shows an example of the configurations of a segment driving circuit and a data supplying circuit.

FIG. 4 shows an example of the configurations of the segment driving circuit 20 and the data supplying circuit 50. The segment driving circuit 20 corresponds to each of the first segment driving circuit 20-1 to the n-th segment driving circuit 20-*n*. The terminal TS corresponds to each of the first terminal TS1 to the n-th terminal TSn, and the drive signal SG corresponds to each of the drive signals SG1 to SGn. The segment driving circuit 20 includes a static-driving circuit 21, a duty-driving circuit 24, a selection circuit 27, and an output circuit 28. The data supplying circuit 50 includes the data storage circuit 52. The segment driving circuit 20 and the data supplying circuit 50 are not necessarily configured as shown in FIG. 4, and various modifications are conceivable, for example, some of the elements may be omitted from the two circuits, or other elements may be added thereto.

The static-driving circuit 21 outputs the static-driving drive signal. For example, when the segment driving circuit 20 is set to perform the static driving, the signal output by the static-driving circuit 21 is output as the drive signal SG to the terminal TS. The duty-driving circuit 24 outputs the duty-driving drive signal. For example, when the segment driving circuit 20 is set to perform the duty driving, the signal output by the duty-driving circuit 24 is output as the drive signal SG to the terminal TS.

For example, the static-driving circuit 21 or the duty-driving circuit 24 selects a drive voltage corresponding to display data DPD out of multiple drive voltages supplied from the drive voltage supplying circuit 70 in FIG. 3, and outputs a signal carrying the selected drive voltage as the drive signal. The drive voltage to be selected includes drive voltages such as VLCDA, VSSA, V3B, V2B, V1B, and VSSB shown in FIGS. 7 to 11, which will be described later.

The output circuit 28 outputs either the drive signal from the static-driving circuit 21 or the drive signal from the duty-driving circuit 24 as the drive signal SG. The output circuit 28 can also be referred to as an output selecting circuit. For example, when the static driving is selected, the output circuit 28 outputs the static-driving signal from the static-driving circuit 21 as the drive signal SG. When the duty driving is selected, the output circuit 28 outputs the duty-driving signal from the duty-driving circuit 24 as the drive signal SG.

When the static-driving circuit 21 or the duty-driving circuit 24 can output a high-impedance signal, the output circuit 28 may not have the drive signal selecting function, and may in this case have only a drive signal buffering function. For example, in the static driving, the duty-driving circuit 24 outputs a high-impedance signal, whereas in the duty driving, the static-driving circuit 21 outputs a high-impedance signal. The output circuit 28 then buffers the drive signal from the static-driving circuit 21 or the duty-driving circuit 24, for example, in a buffer circuit and outputs the buffered drive signal.

The selection circuit 27 receives the display data, and the selection data, based on which the static driving or duty driving is selected, from the data supplying circuit 50. When the static driving is selected based on the selection data, the selection circuit 27 outputs static-driving display data DPD to the static-driving circuit 21. The static-driving circuit 21 outputs the static-driving drive signal based on the static-driving display data DPD. When the duty driving is selected based on the selection data, the selection circuit 27 outputs duty-driving display data DPD to the duty-driving circuit 24. The duty-driving circuit 24 outputs the duty-driving drive signal based on the duty-driving display data DPD.

The selection circuit 27 further outputs a selection signal SEL according to the selection data to the output circuit 28. For example, when the static driving is selected based on the selection data, the selection circuit 27 outputs the selection signal SEL, instructing selection of the output from the static-driving circuit 21, to the output circuit 28. The output circuit 28 can thus select and output the static-driving drive signal from the static-driving circuit 21. When the duty driving is selected based on the selection data, the selection circuit 27 outputs the selection signal SEL, instructing selection of the output from the duty-driving circuit 24, to the output circuit 28. The output circuit 28 can thus select and output the duty-driving drive signal from the duty-driving circuit 24.

A frame signal for static driving FRS and a frame signal for duty driving FRD are input to the selection circuit 27. When the static driving is selected, the selection circuit 27 outputs the display data DPD based on the frame signal for static driving FRS. When the duty driving is selected, the selection circuit 27 outputs the display data DPD based on the frame signal for duty driving FRD. The segment driving circuit 20 thus outputs the static-driving drive signal in synchronization with the frame signal for static driving FRS when the static driving is selected, and outputs the duty-driving drive signal in synchronization with the frame signal for duty driving FRD when the duty driving is selected.

The data supplying circuit 50 includes the data storage circuit 52. The data storage circuit 52 stores the display data, and the selection data, based on which the static driving or the duty driving is selected. A polarity reversal signal PLI for alternating the polarity of the display data and a latch signal LAT are input to the data supplying circuit 50. For example, the data supplying circuit 50 latches the display data from the data storage circuit 52 based on the latch signal LAT. The data supplying circuit 50 outputs the latched display data to the segment driver circuit 20, either inverted or non-inverted, based on the polarity inversion signal PLI.

Figure 5:
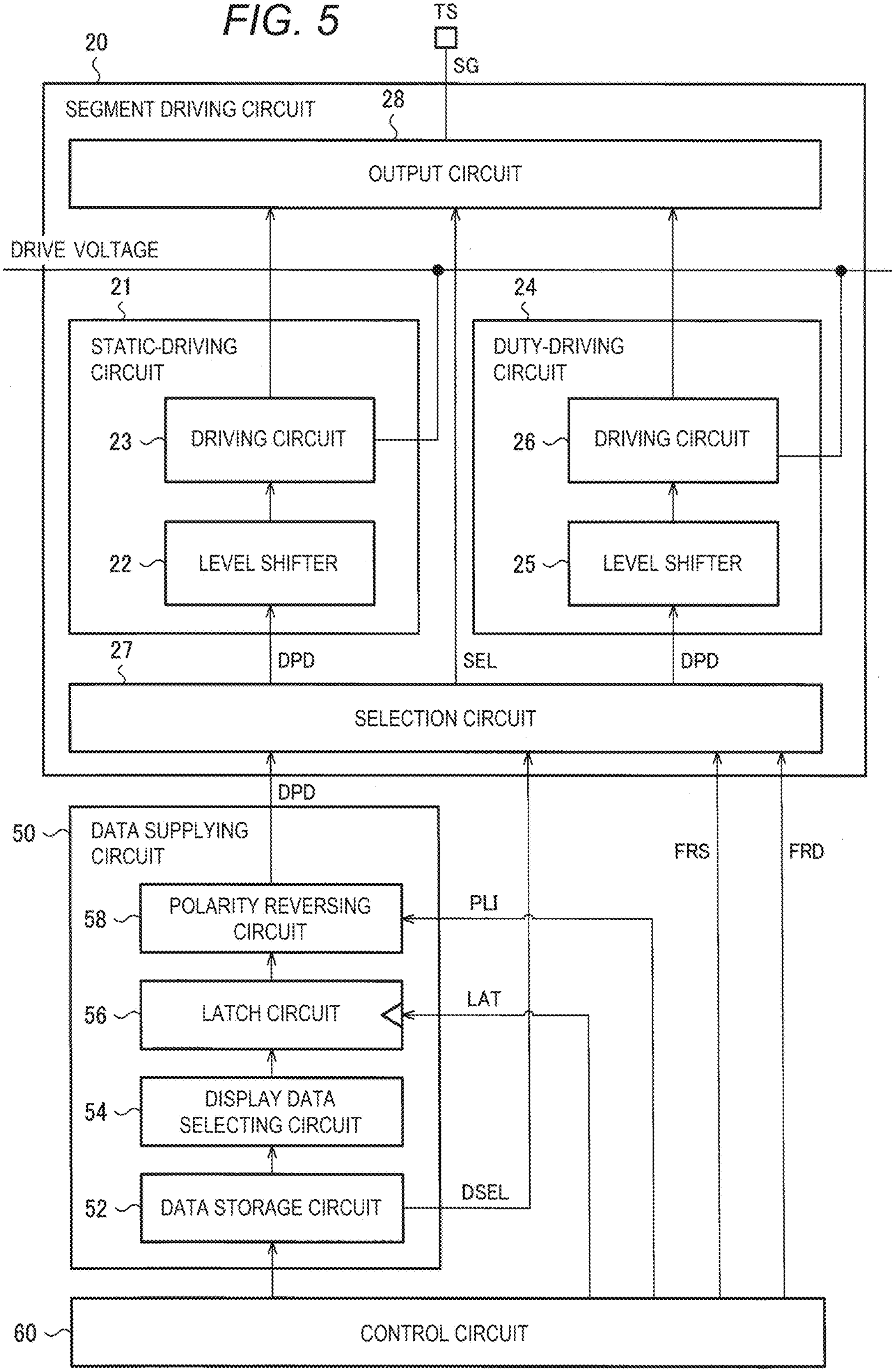
FIG. 5 shows an example of detailed configurations of the segment driving circuit and the data supplying circuit.

FIG. 5 shows an example of detailed configurations of the segment driving circuit 20 and the data supplying circuit 50. In FIG. 5, the data supplying circuit 50 includes the data storage circuit 52, a display data selecting circuit 54, a latch circuit 56, and a polarity reversing circuit 58. The segment driving circuit 20 includes the static-driving circuit 21, the duty-driving circuit 24, the selection circuit 27, and the output circuit 28. The static-driving circuit 21 includes a level shifter 22 and a driving circuit 23, and the duty-driving circuit 24 includes a level shifter 25 and a driving circuit 26.

The data storage circuit 52 stores the display data, and the selection data, based on which the static driving or the duty driving is selected. The display data selecting circuit 54 selects the display data from the data stored in the data storage circuit 52. For example, the display data selecting circuit 54 selects pixel data corresponding to a segment electrode as the display data when the static driving is performed, and selects pixel data on a line basis as the display data when the duty driving is performed. The latch circuit 56 latches the display data from the display data selecting circuit 54 based on the latch signal LAT from the control circuit 60. The latch circuit 56, which is, for example, a line latch, is realized by a flip-flop circuit or the like. The polarity reversing circuit 58, based on the polarity inversion signal PLI from the control circuit 60, alternates the polarity of the display data with each frame. The operation of forwarding and reversing the display data prevents the liquid crystal panel 100 from being burned.

The selection circuit 27 receives the display data DPD from the data supplying circuit 50. The selection circuit 27 receives selection data DSEL from the data storage circuit 52, the frame signal for static driving FRS, and the frame signal for duty driving FRD from the control circuit 60. The selection circuit 27 then outputs the display data DPD to the static-driving circuit 21 when the static driving is performed, and outputs the display data DPD to the duty-driving circuit 24 when the duty driving is performed. The selection circuit 27 further outputs the selection signal SEL based on the selection data DSEL to the output circuit 28.

The static-driving circuit 21 includes the level shifter 22 and the driving circuit 23, and the duty-driving circuit 24 includes the level shifter 25 and the driving circuit 26. The level shifters 22 and 25 each shift a signal having a logic-level voltage to a signal having an analog-level high voltage. The driving circuits 23 and 26 each select a drive voltage according to the display data from the multiple drive voltages and output the selected drive voltage as the drive signal. The output circuit 28 selects, based on the selection signal SEL from the selection circuit 27, the output from the static-driving circuit 21 when the static driving is performed, selects the output from the duty-driving circuit 24 when the duty driving is performed, and outputs the selected output as the drive signal SG to the terminal TS.

Figure 6:
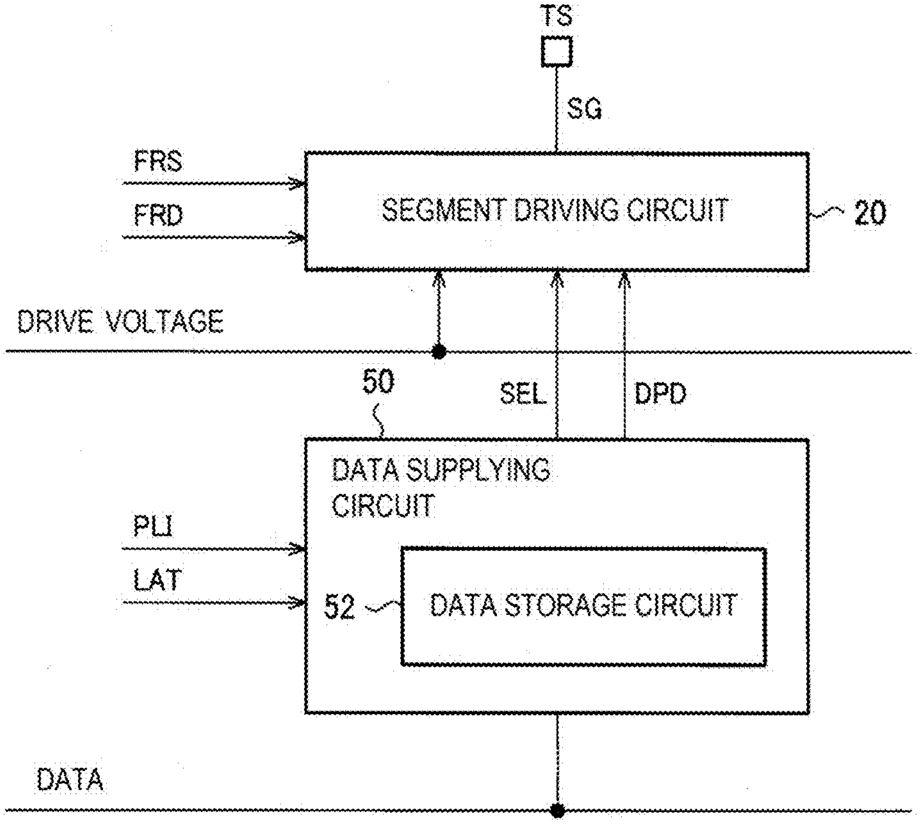
FIG. 6 shows another example of the configurations of the segment driving circuit and the data supplying circuit.

Note that the segment driving circuit 20 and the data supplying circuit 50 do not necessarily have the configurations in FIGS. 4 and 5, and can be changed in various manners. For example, FIG. 6 shows another example of the configurations of the segment driving circuit 20 and the data supplying circuit 50. In FIGS. 4 and 5, the static-driving circuit 21 and the duty-driving circuit 24 are provided separately from each other, whereas in FIG. 6, the two driving circuits are integrated with each other into one. When the static driving is selected based on the selection data DSEL, the segment driving circuit 20 selects the static-driving drive voltage corresponding to the display data from the multiple drive voltages in synchronization with the frame signal for static driving FRS. When the duty driving is selected based on the selection data DSEL, the segment driving circuit 20 selects the duty-driving drive voltage corresponding to the display data from the multiple drive voltages in synchronization with the frame signal for duty driving FRD. For example, when there is a common voltage for the static-driving drive voltage and the duty-driving drive voltage, the configuration in FIG. 6 is effective.

As described above, the driver 10 according to the present embodiment, which drives the liquid crystal panel 100, includes the first terminal TS1 to the n-th terminal TSn electrically coupled to the segment electrodes of the liquid crystal panel 100, and the first segment driving circuit 20-1 to the n-th segment driving circuit 20-*n*, which output drive signals to the first terminal TS1 to the n-th terminal TSn. The first segment driving circuit 20-1 to the n-th segment driving circuit 20-*n* each output the static-driving drive signal when the static driving is set, and outputs the duty-driving drive signal when the duty driving is set. Therefore, when the static driving is set, the segment driving circuits each output the static-driving drive signal, which is output via the terminal corresponding to the segment driving circuit. When the duty driving is set, the segment driving circuits each output the duty-driving drive signal, which is output via the terminal corresponding to the segment driving circuit. Whether to output the static-driving drive signal or the duty-driving drive signal via each of the multiple terminals of the driver 10 can therefore be set on a terminal basis.

The static driving and the duty driving are each exemplary driving in which a driver drives a liquid crystal panel having segment electrodes. A typical driver of related art allows selection from the static driving and the duty driving. One driver only allows selection of one from the static driving and the duty driving, but does not allow selection of one therefrom for each of the terminals of the driver. That is, since the selection from the static driving and the duty driving is collectively made for all the terminals of the driver, one driver cannot select one from the static driving and the duty driving for each of the pixels of the liquid crystal panel.

In contrast, the driver 10 according to the present embodiment allows selection and use of one of the static driving and the duty driving for each of the terminals TS1 to TSn. Since the static driving or the duty driving can be selected for each of the terminals of the driver 10 as described above, the segment electrodes of the liquid crystal panel 100 can be arranged with increased flexibility, so that the layout of the segment electrodes is readily designed. According to the present embodiment, the display quality can also be improved. For example, the driver 10 according to the present embodiment can provide a difference in brightness enhancement display between the warning light described with reference to FIG. 2 and typical displayed objects other than the warning light (such as displayed levels of speed meter, numbers, displayed amount of remaining fuel, or displayed temperature of cooling water). For example, the static driving allows display with an increased contrast ratio and high luminance as compared with the duty driving. Therefore, the segment driving circuit that drives the segment electrode corresponding to the warning light is set to perform the static driving, and the segment driving circuit that drives the segment electrode corresponding to a typical displayed object is set to perform the duty driving. The settings described above can provide a difference in brightness between the warning light and the typical displayed object, and therefore enhance the visibility of the warning light.

As a method according to Comparative Example of the present embodiment, it is conceivable to employ a method for setting the static driving and the duty driving by using the multiple terminals as one block. For example, the segment electrode group for the warning light is driven by the static driving, and the segment electrode group for a typical displayed object other than the warning light is driven by the duty driving. In this method, however, the static-driving terminal group and the duty-driving terminal group are disposed in a scattered manner on a block basis. Therefore, depending on the design of the arrangement of the segment electrodes, which are pixels of the liquid crystal panel, it is difficult to place the wiring between the driver and the segment electrodes, the segment electrodes on the liquid crystal panel are forced to be disposed in accordance with the arrangement of the terminals of the driver, and other design constraints occur. In contrast, in the present embodiment, in which one of the static driving and the duty driving can be selected for each of the multiple terminals, the segment electrodes on the liquid crystal panel 100 can be disposed with increased flexibility, so that the layout of the segment electrodes is readily designed.

In the present embodiment, the driver 10 includes the data supplying circuit 50, and the data supplying circuit 50 supplies the segment driving circuit 20 with the display data, and the selection data, based on which the static driving or the duty driving is selected. For example, in FIG. 5, the data supplying circuit 50 supplies the segment driving circuit 20 with the display data DPD and the selection data DSEL. The segment driving circuit 20 can thus determine whether to perform the static driving or the duty driving based on the selection data from the data supplying circuit 50, and output the drive signal selected from the static-driving drive signal and the duty-driving drive signal to the terminal TS. The display data and the selection data will be described in detail with reference to FIGS. 12 and 13, which will be shown later.

The segment driving circuit 20 outputs the static-driving drive signal when the static driving is selected based on the selection data, and outputs the duty-driving drive signal when the duty driving is selected based on the selection data. For example, in FIG. 5, when the static driving is selected based on the selection data DSEL, the segment driving circuit 20 outputs the static-driving drive signal based on the display data DPD. For example, the segment driving circuit 20 selects a drive voltage corresponding to the display data DPD out of the multiple drive voltages for static driving and outputs the static-driving drive signal to the terminal TS. When duty driving is selected based on the selection data DSEL, the segment driving circuit 20 outputs the duty-driving drive signal based on the display data DPD. For example, the segment driving circuit 20 selects a drive voltage corresponding to the display data DPD out of the multiple drive voltages for duty driving and outputs the duty-driving drive signal to the terminal TS. Whether the segment driving circuit 20 outputs the static-driving drive signal or the duty-driving drive signal can thus be set for each of the terminals based on the selection data.

Figure 7:
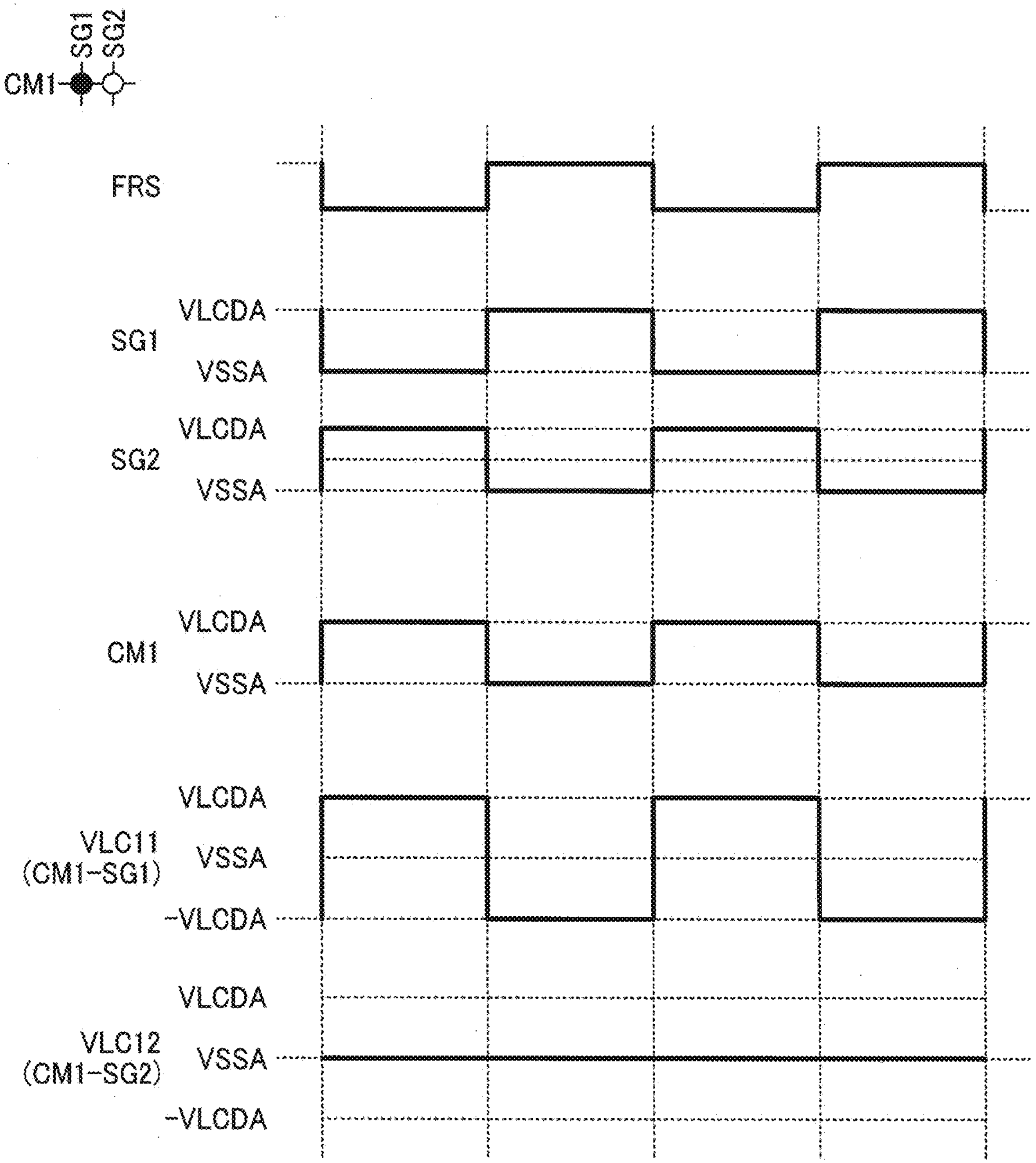
FIG. 7 shows an example of signal waveforms used in static driving.

The segment driving circuit 20 outputs the static-driving drive signal in synchronization with the frame signal for the static driving FRS when the static driving is selected, and outputs the duty-driving drive signal in synchronization with the frame signal for the duty driving FRD when the duty driving is selected. For example, in FIGS. 4 to 6, the frame signal for static driving FRS and the frame signal for duty driving FRD are input to the segment driving circuit 20. The frame signals FRS and FRD are output, for example, by the control circuit 60. When the static driving is selected, the segment driving circuit 20 outputs the static-driving drive signals SG1 and SG2 in synchronization with the frame signal for static driving FRS, as shown in FIG. 7, which will be described later. When the duty driving is selected, the segment driving circuit 20 outputs the duty-driving drive signals SG1 and SG2 in synchronization with the frame signal for duty driving FRD, as shown in FIGS. 8 to 11, which will be described later. Therefore, when the static driving is selected, the segment driving circuit 20 can output the static-driving drive signal in synchronization with the frame signal FRS, which is suitable for the static driving. When the duty driving is selected, the segment driving circuit 20 can output the duty-driving drive signal in synchronization with the frame signal FRD, which is suitable for the duty driving. For example, even when the static driving and the duty driving differ from each other, for example, in terms of the frame cycle, the segment driving circuit 20 can output a drive signal by using a frame signal optimum for each of the static driving and the duty driving.

The segment driving circuit 20 includes the static-driving circuit 21, the duty-driving circuit 24, and the output circuit 28, as shown in FIGS. 4 and 5 and other figures. The static-driving circuit 21 outputs the static-driving drive signal, and the duty-driving circuit 24 outputs the duty-driving drive signal. The output circuit 28 then outputs the static-driving drive signal when the static driving is selected, and outputs the duty-driving drive signal when the duty driving is selected. For example, when the static driving is selected based on the selection signal SEL, the output circuit 28 selects the output from the static-driving circuit 21 and outputs the static-driving drive signal from the static-driving circuit 21. When the duty drive is selected based on the selection signal SEL, the output circuit 28 selects the output from the duty-driving circuit 24 and outputs the duty-driving drive signal from the duty-driving circuit 24. Therefore, when the static driving is selected, the output circuit 28 outputs the drive signal from the static-driving circuit 21, so that the corresponding segment electrode can be driven by the static driving. When the duty driving is selected, the output circuit 28 outputs the drive signal from the duty-driving circuit 24, so that the corresponding segment electrode can be driven by the duty driving.

The driver 10 includes the common driving circuit 31 for static driving, which outputs the static-driving common signal CMS, and the common driving circuit 32 for duty driving, which outputs the duty-driving common signal group CMDG, as shown in FIG. 3. The common driving circuit 31 for static driving outputs a common signal CM1 shown, for example, in FIG. 7, which will be described later, as the common-driving common signal CMS. The common driving circuit 32 for duty driving outputs common signals CM1, CM2, CM3, and CM4 shown, for example, in FIGS. 8 to 10, which will be described later, as the common-driving common signal group CMDG. The common signal from the common driving circuit 31 for static driving is therefore supplied to the common electrode corresponding to a segment electrode driven by the segment driving circuit 20 set to perform the static driving. The common signal from the common driving circuit 32 for duty driving is supplied to the common electrode corresponding to a segment electrode driven by the segment driving circuit 20 set to perform the duty driving. A common signal having an appropriate signal waveform according to the driving by which the segment electrode is driven can therefore be supplied to the corresponding common electrode, so that the static driving or the duty driving using the appropriate signal waveform can be achieved.

2. Static Driving and Duty Driving

Specific examples of the signal waveforms used in the static driving and the duty driving will next be described. For example, FIG. 7 shows an example of the signal waveforms used in the static driving. FIG. 7 shows an example of the signal waveforms used when a segment electrode EL11 having pixels to which the common signal CM1 and the drive signal SG1 are applied is displayed in black, and a segment electrode EL12 having pixels to which the common signal CM1 and the drive signal SG2 are applied is displayed in white. The description below will be made with reference to the normally white display. The reference characters of the segment electrodes such as EL11 and EL12 are omitted in the description.

The segment driving circuit 20 set to perform the static driving outputs the drive signals SG1 and SG2 shown in FIG. 7 to the segment electrodes EL11 and EL12, respectively, and the common driving circuit 31 for static driving outputs the common signal CM1 to the common electrodes corresponding to EL11 and EL12. Symbols VLCDA and VSSA in FIG. 7 represent drive voltages for static driving that are supplied from the drive voltage supplying circuit 70 shown in FIG. 3. A voltage signal VLC11 corresponding to the difference in voltage between CM1 and SG1 is thus applied to the liquid crystal material between the segment electrode EL11 and the corresponding common electrode. A voltage signal VLC12 corresponding to the difference in voltage between CM1 and SG2 is applied to the liquid crystal material between the segment electrode EL12 and the corresponding common electrode. Since the normally white display is employed, the voltage signal VLC11 having a highly effective voltage is applied to the liquid crystal material at the segment electrode EL11, a displayed object corresponding to the segment electrode EL11, such as warning light, is displayed in black, which indicates the light-on state. A displayed object corresponding to the segment electrode EL12, such as a warning light, is displayed in white, which indicates the light-off state.

Figure 8:
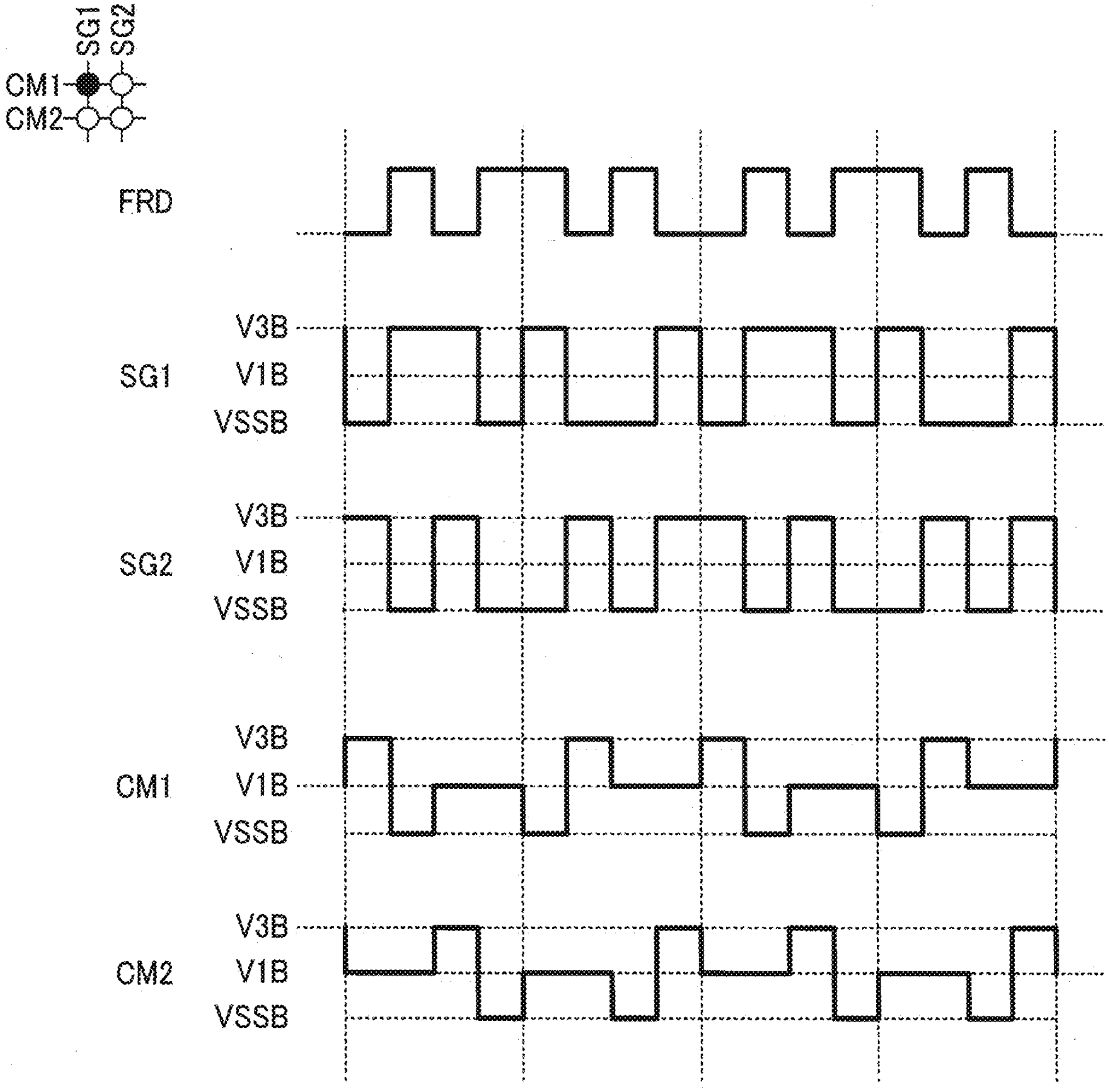
FIG. 8 shows an example of signal waveforms used in duty driving.
Figure 9:
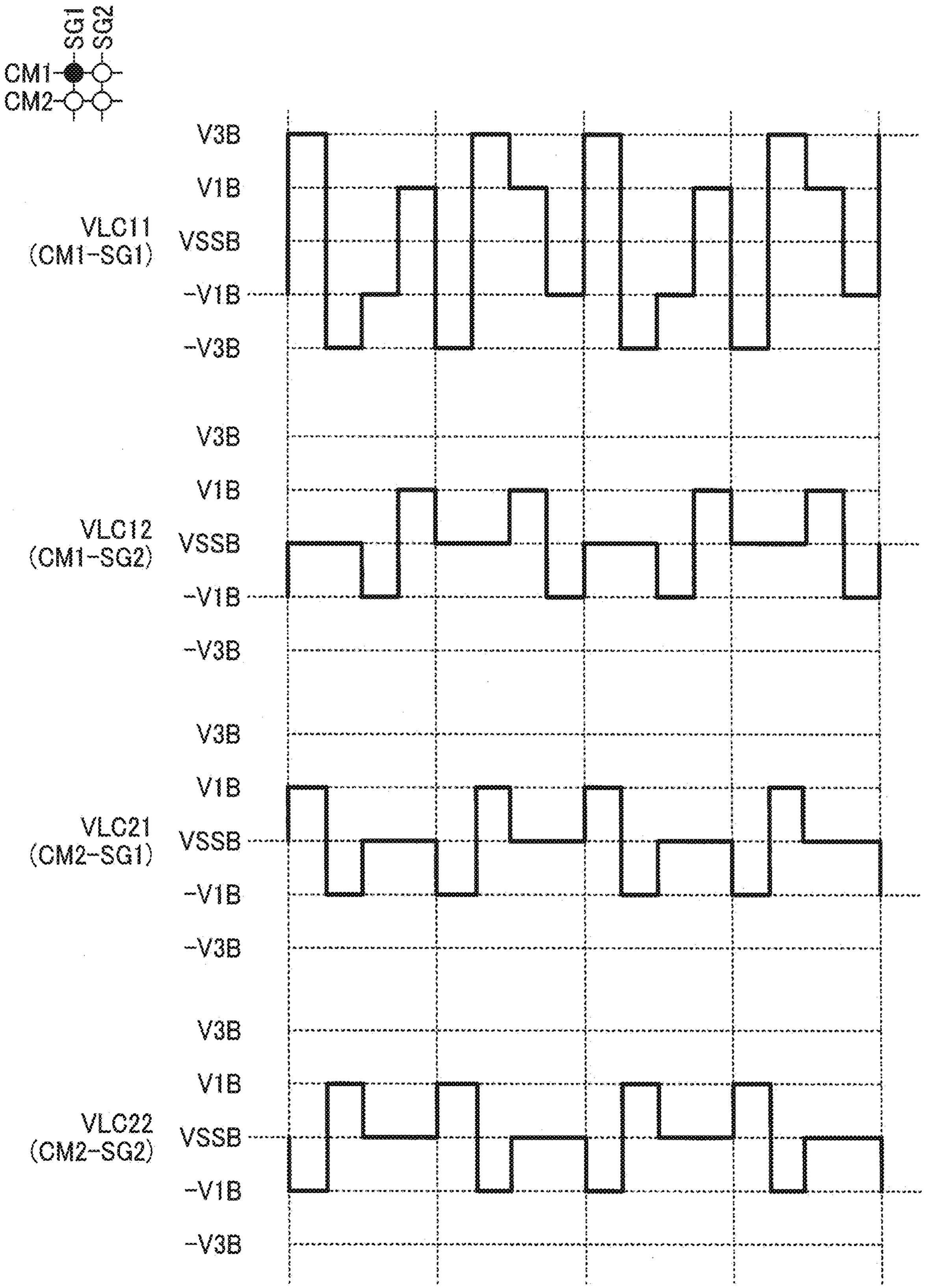
FIG. 9 shows an example of the signal waveforms used in the duty driving.

FIGS. 8 and 9 show examples of the signal waveforms used in the duty driving. FIG. 8 and FIG. 9 show an example of the ½ duty driving in which four segment electrodes are displayed by two segment lines corresponding to the drive signals SG1 and SG2 and two common lines corresponding to the common signals CM1 and CM2. For example, in FIGS. 8 and 9, one frame is divided into two subfields, and the common signals CM1 and CM2 sequentially become selected-state signals in each of the two subfields. It is assumed in the description that the segment electrodes at the first line (first subfield) driven by CM1, and SG1 and SG2 are referred to as EL11 and EL12, respectively, and that the segment electrodes at the second line (second subfield) driven by CM2, and SG1 and SG2 are referred to as EL21 and EL22, respectively. In this case, FIGS. 8 and 9 show an example of the signal waveforms used when the segment electrodes EL11 and EL12 at the first line are displayed in black and in white, respectively, and the segment electrodes EL21 and EL22 at the second line are both displayed in white.

The segment driving circuit 20 set to perform the duty driving outputs the drive signal SG1 shown in FIG. 8 to the segment electrodes EL11 and EL21. The common driving circuit 32 for duty driving then outputs the common signals CM1 and CM2 to the common electrodes corresponding to EL11 and EL21. The adjacent segment driving circuit 20 also set to perform the duty driving outputs the drive signal SG2 shown in FIG. 8 to the segment electrodes EL12 and EL22. The common driving circuit 32 for duty driving then outputs the common signals CM1 and CM2 to the common electrodes corresponding to EL12 and EL22. Symbols V3B, V1B, and VSSB in FIG. 8 represent drive voltages for ½ duty driving that are supplied from the drive voltage supplying circuit 70 in FIG. 3.

Therefore, the voltage signal VLC11 corresponding to the difference in voltage between CM1 and SG1 is applied to the liquid crystal material between the segment electrode EL11 at the first line and the corresponding common electrode, and the voltage signal VLC12 corresponding to the difference in voltage between CM1 and SG2 is applied to the liquid crystal material between the segment electrode EL12 at the first line and the corresponding common electrode, as shown in FIG. 9. A voltage signal VLC21 corresponding to the difference in voltage between CM2 and SG1 is applied to the liquid crystal material between the segment electrode EL21 at the second line and the corresponding common electrode, and a voltage signal VLC22 corresponding to the difference in voltage between CM2 and SG2 is applied to the liquid crystal material between the segment electrode EL22 at the second line and the corresponding common electrode. Since the voltage signal VLC11 having an effective voltage higher than those of the voltage signals VCL12, VLC21, and VLC22 is applied to the leftmost segment electrode EL11 at the first line, the displayed object corresponding to the segment electrode EL11 is displayed in black, which indicates the light-on state, as shown in FIG. 9.

Figure 10:
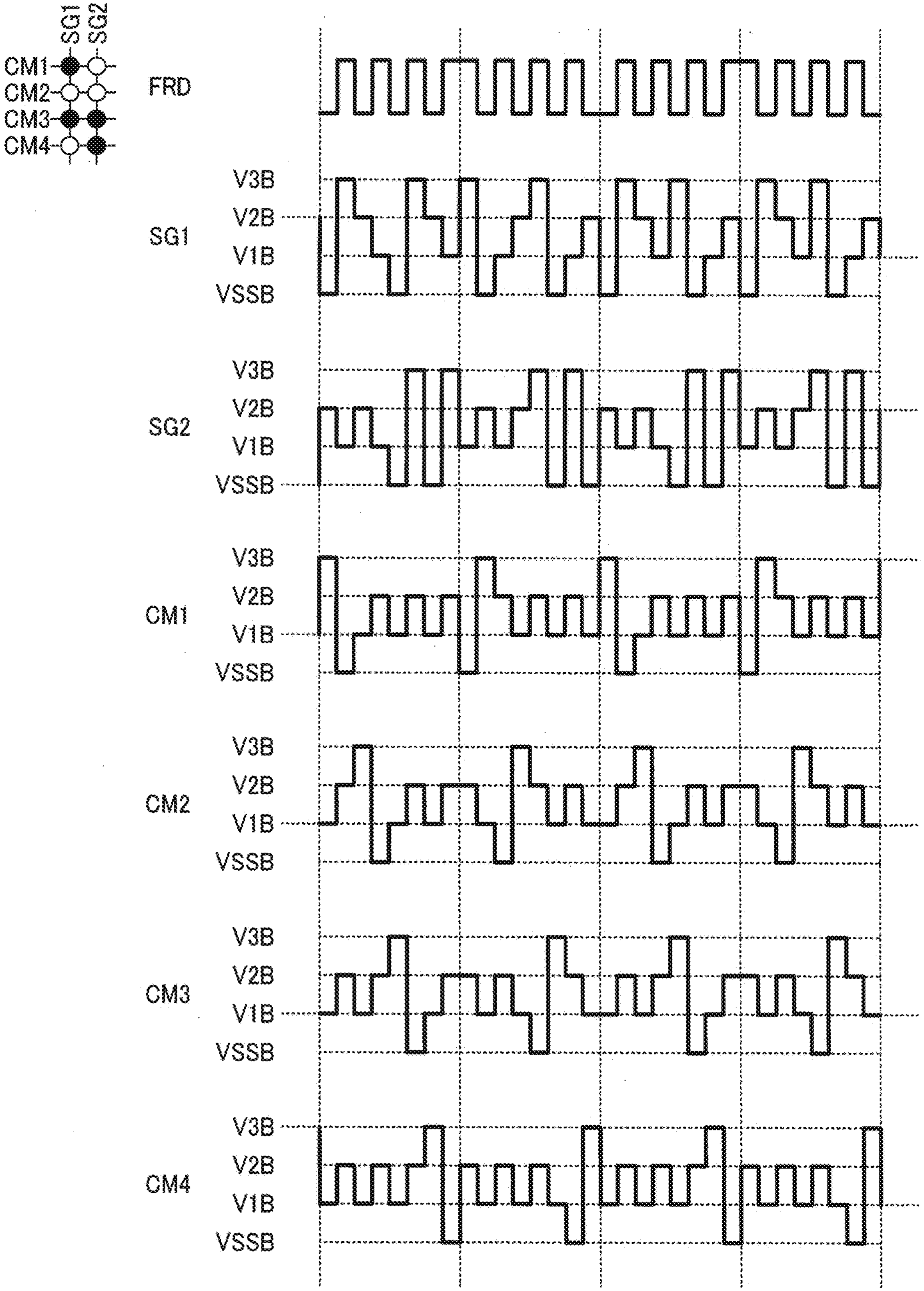
FIG. 10 shows an example of the signal waveforms used in the duty driving.
Figure 11:
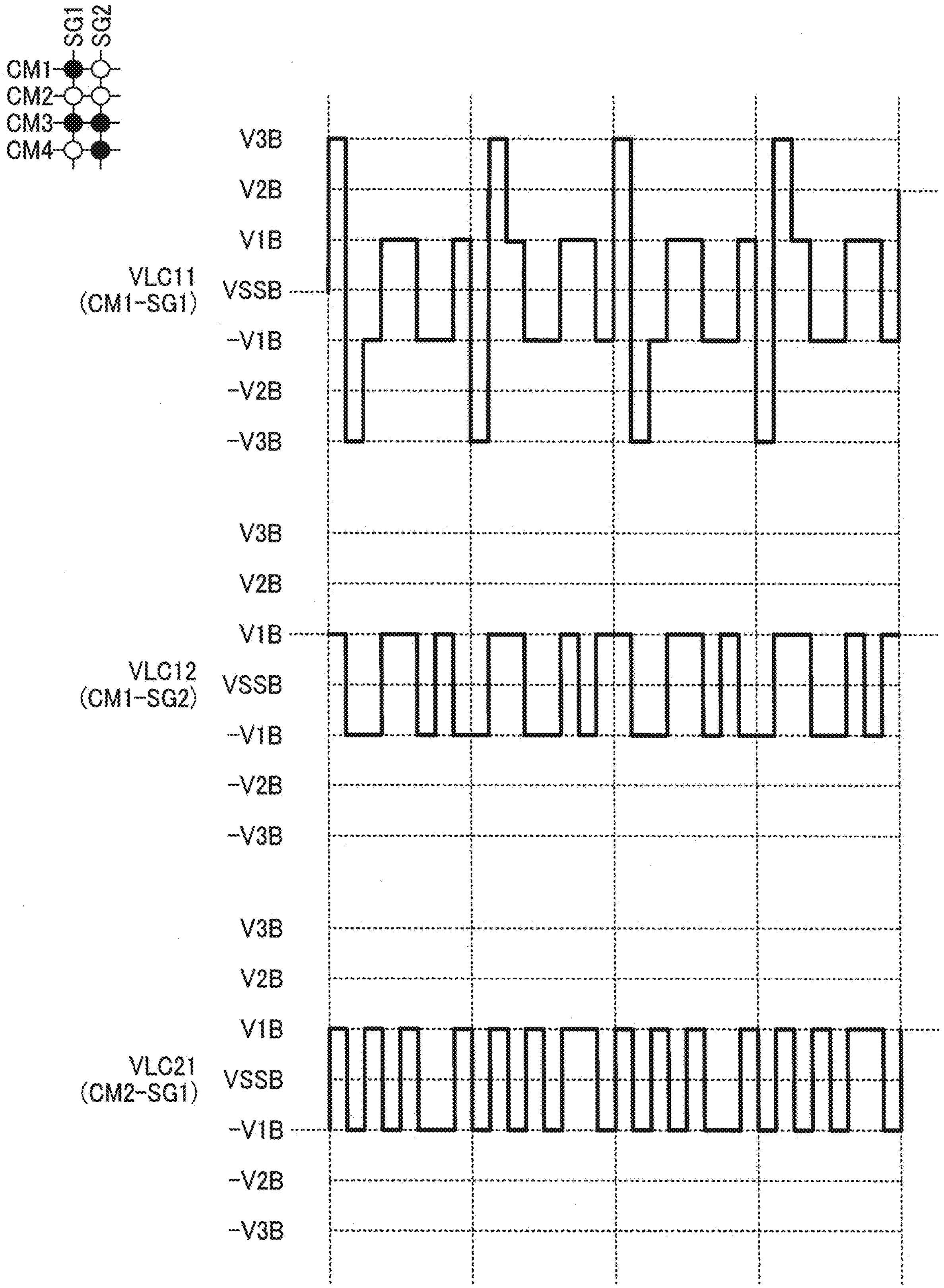
FIG. 11 shows an example of the signal waveforms used in the duty driving.

FIGS. 10 and 11 show an example of the signal waveforms used in the ¼ duty driving. In the ¼ duty driving shown in FIGS. 10 and 11, the eight-segment electrode is displayed by two segment lines corresponding to the drive signals SG1 and SG2 and four common lines corresponding to the common signals CM1, CM2, CM3, and CM4. For example, in FIGS. 10 and 11, one frame is divided into four subfields, and the common signals CM1, CM2, CM3, and CM4 sequentially become selected-state signals in each of the four subfields. It is assumed in the description that the segment electrodes at the first line (first subfield) driven by CM1, and SG1 and SG2 are referred to as EL11 and EL12, respectively, and that the segment electrodes at the second line (second subfield) driven by CM2, and SG1 and SG2 are referred to as EL21 and EL22, respectively. It is further assumed that the segment electrodes at the third line (third subfield) driven by CM3, and SG1 and SG2 are referred to as EL31 and EL32, respectively, and that the segment electrodes at the fourth line (fourth subfield) driven by CM4, and SG1 and SG2 are referred to as EL41 and EL42, respectively. In this case, FIGS. 10 and 11 show an example of the signal waveforms used when the segment electrodes EL11 and EL12 at the first line are displayed in black and in white, respectively, the segment electrodes EL21 and EL22 at the second line are both displayed in white, the segment electrodes EL31 and EL32 at the third line are both displayed in black, and the segment electrodes EL41 and EL42 at the fourth line are displayed in white and in black, respectively.

The segment driving circuit 20 set to perform the duty driving outputs the drive signal SG1 shown in FIG. 10 to the segment electrodes EL11, EL21, EL31, and EL41, and the common driving circuit 32 for duty driving outputs the common signals CM1, CM2, CM3, and CM4 to the common electrodes corresponding to EL11, EL21, EL31, and EL41, respectively. The adjacent segment driving circuit 20 also set to perform the duty driving outputs the drive signal SG2 shown in FIG. 10 to the segment electrodes EL12, EL22, EL32, and EL42, and the common driving circuit 32 for duty driving outputs the common signals CM1, CM2, CM3, and CM4 to the common electrodes corresponding to EL12, EL22, EL32, and EL42, respectively. Symbols V3B, V2B, V1B, and VSSB in FIG. 8 represent drive voltages for ¼ duty driving that are supplied from the drive voltage supplying circuit 70 in FIG. 3.

Therefore, the voltage signal VLC11 corresponding to the difference in voltage between CM1 and SG1 is applied to the liquid crystal material between the segment electrode EL11 at the first line and the corresponding common electrode, and the voltage signal VLC12 corresponding to the difference in voltage between CM1 and SG2 is applied to the liquid crystal material between the segment electrode EL12 at the first line and the corresponding common electrode, as shown in FIG. 11. The voltage signal VLC21 corresponding to the difference in voltage between CM2 and SG1 is applied to the liquid crystal material between the segment electrode EL21 at the second line and the corresponding common electrode. Since the voltage signal VLC11 having an effective voltage higher than those of the voltage signals VCL12 and VLC21 is applied to the leftmost segment electrode EL11 at the first line, the displayed object corresponding to the segment electrode EL11 is displayed in black, which indicates the light-on state, as shown in FIG. 11.

In the static driving shown in FIG. 7, there is a large effective voltage difference between the effective voltage (VLC11) applied to the liquid crystal material at the segment electrode EL11 in the light-on state (displayed in black) and the effective voltage (VLC12) applied to the liquid crystal material at the segment electrode EL12 in the light-off state (displayed in white). In the duty driving shown in FIGS. 8 to 11, the effective voltage difference between the effective voltage (VLC11) applied to the liquid crystal material at the segment electrode EL11 in the light-on state and the effective voltage (VLC12) applied to the liquid crystal material at the segment electrode EL12 in the light-off state is smaller than the effective voltage difference in the static driving shown in FIG. 7. The static driving of the segment electrodes EL11 and EL12 performed by the segment driving circuit 20 shown in FIG. 7 can therefore increase the effective voltage difference between the light-on state and the light-off state as compared with the effective voltage difference in the duty driving shown in FIGS. 8 to 11, so that the warning light corresponding to the segment electrodes EL11 and EL12 can be displayed at high contrast. For example, the difference in luminance between the case where the liquid crystal material is opaque so that the warning light is displayed in black and the case where the liquid crystal material is transparent so that the warning light is displayed in white becomes the luminance corresponding to the maximum luminance of the backlight, so that the warning light can be displayed at high contrast. On the other hand, the duty driving of the segment electrode of a displayed object other than the warning light as shown in FIGS. 8 to 11 can reduce the number of the segment wires as compared with the static driving, resulting in advantages, for example, the region where the segment lines of the liquid crystal panel 100 are wired can be reduced, and the segment lines can be readily wired.

3. Display Data and Selection Data

Figure 13:
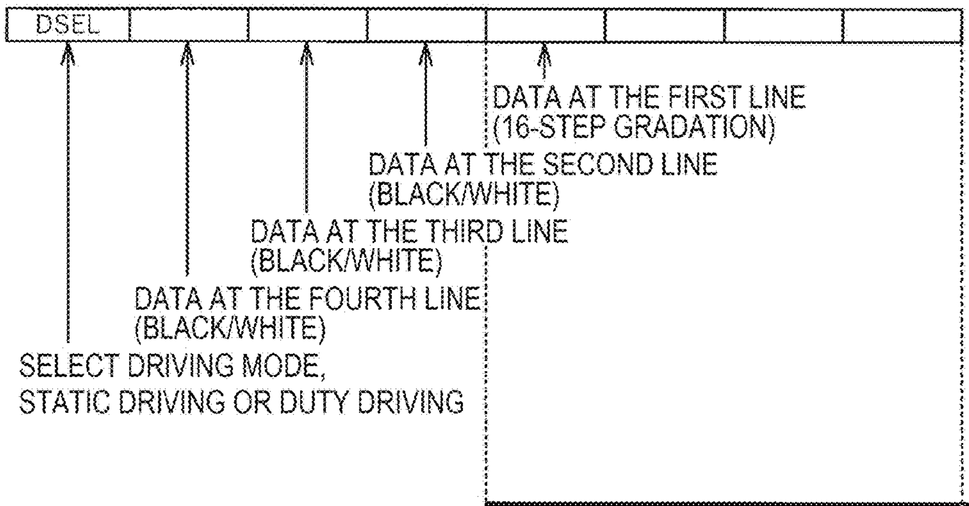
FIG. 13 shows an example of the format of the data including the display data and the selection data.

FIGS. 12 and 13 show an example of formats of the display data, the selection data, and other data stored in the data storage circuit 52. In FIG. 12, 8-bit data (DO to D7), for example, are stored in the data storage circuit 52 in association with each of the segment electrode (SEG1, SEG2, SEG3, . . . ). The static-driving of duty-driving selection data DSEL is stored, for example, at the bit D7 of the data stored in the data storage circuit 52, as shown in FIG. 13. The display data on the segment electrode is stored, for example, at the bits DO to D6 of the data. For example, in the ¼ duty driving shown in FIGS. 10 and 11, the data at the first line, the data at the second line, the data at the third line, and the data at the fourth line that correspond to the subfields are stored at the bits D3, D4, D5, and D6, respectively. Data that is, for example, one when the data is displayed in black and is, for example, zero when the data is displayed in white is stored at the bits D3, D4, D5, and D6. In the ½ duty driving shown in FIGS. 8 and 9, the data at the third line and the data at the fourth line are unnecessary.

In the static driving shown in FIG. 7, data displayed in black or in white is stored, for example, at the bit D3. In the static driving, gradation display can be performed, in which case, gradation data in the static driving may be stored, for example, at the bits D3 to DO, as shown in FIG. 13. For example, 4-bit gradation data stored at D3 to DO allows 16-step gradation display. The gradation display in the static driving can be realized, for example, by PWM gradation control in which the pulse width of a drive signal is changed in accordance with the gradation data, or PMA gradation control in which the voltage level of a drive signal is changed in accordance with the gradation data.

As described above, in the present embodiment, the display data, and the selection data, based on which the static driving or the duty driving is selected, are stored in the data storage circuit 52 and supplied by the data supplying circuit 50 to the segment driving circuit 20. In this case, the data supplying circuit 50 supplies the segment driving circuit 20 with data including the selection data set at the s-th bit and the display data for duty driving or display data for static driving set at the t-th bit to the u-th bit. Symbols s, t, and u are integers greater than or equal to one and different from each other. In FIG. 13 by way of example, the selection data DSEL is stored at the bit D7, which is the s-th bit of the data. The display data for duty driving or the display data for static driving are set at bits DO to D6, which are the t-th bit to the u-th bit of data. The segment driving circuit 20 can thus determine which drive signal, the static-driving drive signal or the duty-driving drive signal, is output by referring to the s-th bit of the data supplied from the data supplying circuit 50. The segment driving circuit 20 can then output the static-driving drive signal or the duty-driving drive signal selected in accordance with the selection data based on the display data set at the t-th bit to the u-th bit of the data supplied from the data supplying circuit 50.

In the static driving, the display data may be set at least at one of the t-th bit to the u-th bit. In the gradation display static driving, the gradation data may be set at multiple bits of the t-th to u-th bits. In the duty driving, the display data may be set at multiple bits of the t-th bit to the u-th bit. The number of bits at which data is set varies in accordance, for example, with the duty (number of lines) of the duty driving.

4. Layout and Backlight

Figure 14:
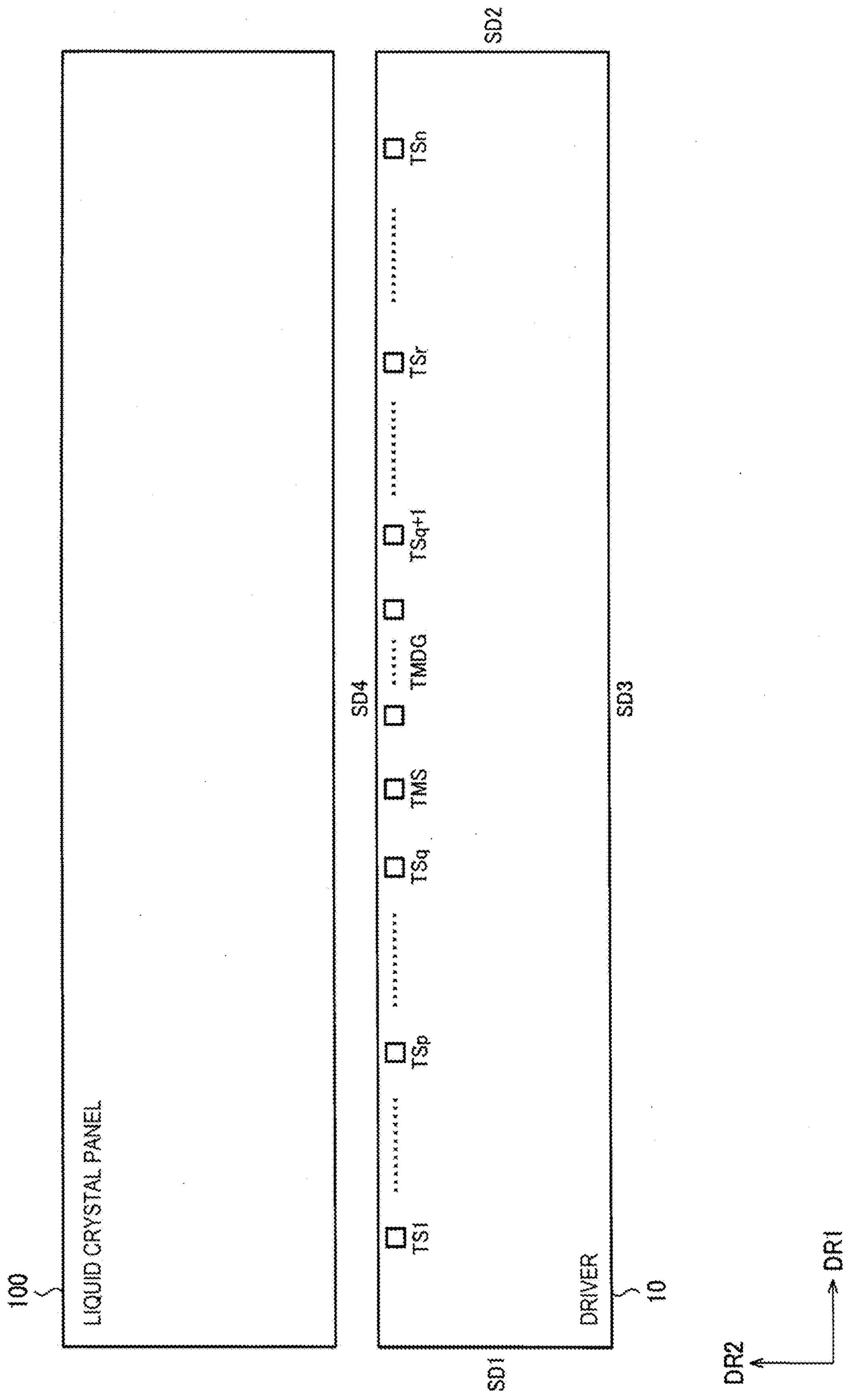
FIG. 14 shows an example of the layout of terminals of the driver.

FIG. 14 shows an example of the layout of the first terminal TS1 to the n-th terminal TSn, the common terminal TMS, and the terminals of the common terminal group TMDG in the driver 10. In FIG. 14, the driver 10, which is a semiconductor IC, has sides SD1 and SD2, which are short sides, and sides SD3 and SD4, which are long sides, in the plan view. The side SD2 faces the side SD1, and the side SD4 faces the side SD3. It is assumed that the direction along the sides SD4 and SD3, which are the long sides, is a first direction DR1, and that the direction perpendicular to the first direction DR1 is a second direction DR2. The second direction DR2 is the direction along the sides SD1 and SD2, which are the short sides. For example, the first direction DR1 is the direction from the side SD1 toward the side SD2, which faces the side SD1. The second direction DR2 is the direction from the side SD3 toward the side SD4, which faces the side SD3. Note that the shape of the driver 10 in the plan view only needs to be a substantially quadrilateral shape, and the quadrilateral shape may, for example, have chamfered corners.

The first terminal TS1 to the n-th terminal TSn, via which drive signals that drive segment electrodes are output, are arranged along the side SD4 of the driver 10, as shown in FIG. 14. For example, the i-th terminal TSi and the (i+1)-th terminal TSi+1 of the first terminal TS1 to the n-th terminal TSn are disposed adjacent to each other along the first direction DR1, which is the direction along the side SD4, which is, for example, a long side of the driver 10. The static-driving or duty-driving drive signal can thus be output via each of the first terminal TS1 to the n-th terminal TSn arranged along the side SD4 of the driver 10. That is, the drive signal for static-driving or duty-driving that the segment driving circuit 20 corresponding to each of the first terminal TS1 to the n-th terminal TSn arranged along the side SD4 has been set to perform can be output via the terminal. That is, whether to output the drive signal for static driving or the drive signal for duty driving can be freely set for each of the first terminal TS1 to the n-th terminal arranged along the side SD4 of the driver 10.

The driver 10 includes the common terminal TMS for static driving, via which the static-driving common signal CMS is output, and the common terminal group TMDG for duty driving, via which the duty-driving common signal group CMDG is output, as shown in FIG. 14 and FIG. 3, the latter of which has been shown before. The common terminal TMS for static driving and the common terminal group TMDG for duty driving are disposed, for example, along the side SD4 of the driver 10. Therefore, the common signal output by the common driving circuit 31 for static driving can be output via the common terminal TMS, and the common signal group output by the common driving circuit 32 for duty driving can be output via the common terminal group TMDG. The static driving of a segment electrode can then be performed by using the common signal CMS output via the common terminal TMS. Furthermore, the duty driving of a segment electrode can be performed by using the common signal group CMDG output via the common terminal group TMDG. For example, in the ½ duty driving shown in FIGS. 8 and 9 described above, the two common signals CM1 and CM2 are output as the common signal group CMDG via the common terminal group TMDG. In the ¼ duty drive shown in FIGS. 10 and 11, the four common signals CM1, CM2, CM3, and CM4 are output as the common signal group CMDG via the common terminal group TMDG.

The first terminal TS1 to the n-th terminal TSn include a p-th terminal TSp to a q-th terminal TSq and a (q+1)-th terminal TSq+1 to an r-th terminal TSr, as shown in FIG. 14. For example, the p-th terminal TSp to the q-th terminal TSq are disposed along the side SD4 of the driver 10, and the (q+1)-th terminal TSq+1 to the r-th terminal TSr are also disposed along the side SD4 of the driver 10. Symbols p, q, and r are integers greater than or equal to one and satisfy, for example, p<q<r. The common terminal TMS for static driving and the common terminal group TMDG for duty driving are disposed between the q-th terminal TSq and the (q+1)-th terminal TSq+1. For example, the common terminal TMS and the common terminal group TMDG are disposed along the side SD4 of the driver 10 between the q-th terminal TSq and the (q+1)-th terminal TSq+1. For example, the common terminal TMS and the common terminal group TMDG are disposed in the first direction DR1 away from the q-th terminal TSq, and the (q+1)-th terminal TSq+1 is disposed in the first direction DR1 away from the common terminal TMS and the common terminal group TMDG. The common terminal TMS and the common terminal group TMDG are thus disposed in the space between the q-th terminal TSq and the (q+1)-th terminal TSq+1, the common signal CMS for static driving can be output via the common terminal TMS, and the common signal group CMDG for duty driving can be output via the common terminal group TMDG. Therefore, in the liquid crystal panel 100, the segment electrodes and the common electrodes can be readily disposed, and the segment lines and the common lines can be readily wired.

In FIG. 14, in which the common terminal TMS and the common terminal group TMDG are disposed in a single region, the common terminal TMS and the common terminal group TMDG may instead be disposed in each of multiple regions where the terminals are disposed. The common driving circuit 31 for static driving, which outputs the common signal CMS to the common terminal TMS, and the common driving circuit 32 for duty driving, which outputs the common signal group CMDG to the common terminal group TMDG, can be disposed, for example, adjacent to each other along the side SD4 of the driver 10. For example, the common terminal TMS and the common terminal group TMDG may be disposed between a first common driving circuit group that outputs drive signals to the p-th terminal TSp to the q-th terminal TSq and a second common driving circuit group that outputs drive signals to the (q+1)-th terminal TSq+1 to the r-th terminal TSr.

The electro-optical apparatus 200 according to the present embodiment includes the driver 10 and the liquid crystal panel 100, as shown in FIGS. 1 and 3. The various displayed objects corresponding to the segment electrodes can therefore be displayed on the liquid crystal panel 100. For example, the warning light or the displayed object other than the warning light can be displayed on the liquid crystal panel 100.

Figure 15:
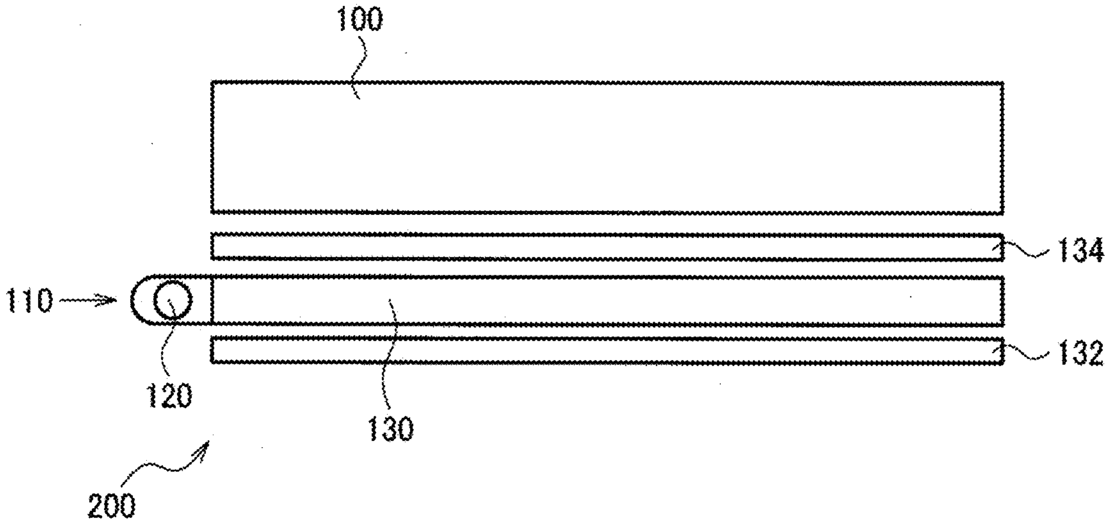
FIG. 15 is an example of the configuration of the electro-optical apparatus.

The electro-optical apparatus 200 may include a backlight 110, as shown in FIG. 15. In FIG. 15, the backlight 110 includes a light guide plate 130 and a light source 120 provided at least at one side of the light guide plate 130. The light source 120 is realized, for example, by an LED element or a cold cathode tube. For example, what is called an edge backlight or a side backlight can be employed as the backlight 110. FIG. 15 is a side view of the electro-optical apparatus 200, with the light source 120 provided, for example, at one side of the light guide plate 130 in the plan view of the electro-optical apparatus 200. In this case, multiple light sources 120 may be disposed at one side of the light guide plate 130. Instead, when a light source 120 is provided at a first side of the light guide plate 130, another light source 120 may be provided at a second side of the light guide plate 130 that faces the first side. The light guide plate 130, which is a light guide sheet, is realized, for example, by an acrylic plate. A diffuser plate 134, which is, for example, a diffuser sheet, is provided between the light guide plate 130 and the liquid crystal panel 100. A reflection plate 132, which is, for example, a reflection sheet, is provided at a side of the light guide plate 130 that is opposite the liquid crystal panel 100. Providing the backlight 110 shown in FIG. 15 allows the light from the light source 120 to be guided through the light guide plate 130, and the guided light to be incident on the liquid crystal panel 100 in a substantially uniform manner from the side facing the rear surface of the liquid crystal panel 100.

It is difficult to display high-contrast warning light by controlling the backlight 110 having the configuration shown in FIG. 15, in which the light from the backlight 110 is radiated in a substantially uniform manner from the side facing the rear surface of the liquid crystal panel 100. In this regard, in the present embodiment, the segment driving circuit 20 can be set to perform the static driving or the duty driving. The segment driving circuit 20 set to perform the static driving and configured to drive a segment electrode corresponding to warning light can provide an electro-optical apparatus 200 capable of displaying the warning light at contrast higher than other displayed objects even when the backlight 110 configured as shown in FIG. 15 is used.

As described above, a driver according to the present embodiment configured to drive a liquid crystal panel includes a first terminal to an n-th terminal electrically coupled to segment electrodes of the liquid crystal panel, and a first segment driving circuit to an n-th segment driving circuit configured to output a static-driving or duty-driving drive signal to the first terminal to the n-th terminal. The first segment driving circuit to the n-th segment driving circuit are each configured to output the static-driving drive signal when the static driving is set, and output the duty-driving drive signal when the duty driving is set.

According to the present embodiment, when the static driving is set, the first segment driving circuit to the n-th segment driving circuit each output the static-driving drive signal, which is output via the terminal corresponding to the segment driving circuit. When the duty driving is set, the segment driving circuits each output the duty-driving drive signal, which is output via the terminal corresponding to the segment driving circuit. Whether to output the static-driving drive signal or the duty-driving drive signal from each of the first terminal to the n-th terminal of the driver can therefore be set on a terminal basis.

In the present embodiment, the driver may include a data supplying circuit configured to supply each of the segment driving circuits with display data, and selection data based on which the static driving or the duty driving is selected.

The segment driving circuits can thus each determine whether to perform the static driving or the duty driving based on the selection data from the data supplying circuit, and output the drive signal selected from the static-driving drive signal and the duty-driving drive signal.

In the present embodiment, the segment driving circuits may each be configured to output the static-driving drive signal when the static driving is selected based on the selection data, and output the duty-driving drive signal when the duty driving is selected based on the selection data.

Whether the segment driving circuits each output the static-driving drive signal or the duty-driving drive signal can thus be set for each of the terminals based on the selection data.

In the present embodiment, the data supplying circuit may be configured to supply each of the segment driving circuits with data including the selection data set at an s-th bit and the display data for duty driving or the display data for static driving set at a t-th bit to a u-th bit.

The segment driving circuits can thus each determine which drive signal, the static-driving drive signal or the duty-driving drive signal, is output by referring to the s-th bit of the data supplied from the data supplying circuit. The segment driving circuits can then each output the static-driving drive signal or the duty-driving drive signal selected in accordance with the selection data based on the display data set at the t-th bit to the u-th bit of the data supplied from the data supplying circuit.

In the present embodiment, the segment driving circuits may each configured to output the static-driving drive signal in synchronization with a frame signal for static driving when the static driving is selected, and output the duty-driving drive signal in synchronization with a frame signal for duty driving when the duty driving is selected.

The segment driving circuits can thus each output the static-driving drive signal in synchronization with a frame signal appropriate for the static driving when the static driving is selected, and output the duty-driving drive signal in synchronization with a frame signal appropriate for the duty driving when the duty driving is selected.

In the present embodiment, the segment driving circuits may each include a static-driving circuit configured to output the static-driving drive signal, a duty-driving circuit configured to output the duty-driving drive signal, and an output circuit configured to output the static-driving drive signal when the static driving is selected and output the duty-driving drive signal when the duty driving is selected.

Therefore, when the static driving is selected, the output circuit can output the drive signal from the static-driving circuit to enable the static driving of the corresponding segment electrode, and when the duty driving is selected, the output circuit can output the drive signal from the duty-driving circuit to enable the duty driving of the corresponding segment electrode.

In the present embodiment, the driver may include a common driving circuit for static driving configured to output a common signal for the static-driving; and a common driving circuit for duty driving configured to output a common signal group for the duty-driving.

Therefore, the common signal for static driving is supplied to the common electrode corresponding to the segment electrode driven by the segment driving circuit set to perform the static driving, and the common signal for duty driving is supplied to the common electrode corresponding to the segment electrode driven by the segment driving circuit set to perform the duty driving.

In the present embodiment, the driver may include a common terminal for static driving via which the static-driving common signal is output, and a common terminal group for duty driving via which the duty-driving common signal group is output.

Therefore, the common signal output by the common driving circuit for static driving can be output via the common terminal for static driving, and the common signal group output by the common driving circuit for duty driving can be output via the common terminal group for duty driving.

In the present embodiment, the first terminal to the n-th terminal may include a p-th terminal to a q-th terminal and a (q+1)-th terminal to an r-th terminal, and the common terminal for static driving and the common terminal group for duty driving may be disposed between the q-th terminal and the (q+1)-th terminal.

Therefore, the common terminal and the common terminal group are disposed in the space between the q-th terminal and the (q+1)-th terminal, the common signal for static driving can be output via the common terminal, and the common signal group for duty driving can be output via the common terminal group.

In the present embodiment, the first terminal to the n-th terminal may be arranged along a side of the driver.

The static-driving drive signal or the duty-driving drive signal can thus be output via each of the first terminal to the n-th terminal arranged along the side of the driver.

An electro-optical apparatus according to the present embodiment may include the driver and the liquid crystal panel described above.

Note that the present embodiment has been described above in detail, and a person skilled in the art may readily understand that many modifications can be made to the present embodiment without substantially departing from the novel items and advantages of the present disclosure. Such modifications are all therefore assumed to fall within the scope of the present disclosure. For example, a term described at least once in the specification or the drawings along with a different term having a broader meaning or the same meaning can be replaced with the different term anywhere in the specification or the drawings. Furthermore, any combination of the present embodiment and the modifications fall within the scope of the present disclosure. Moreover, the configurations, operations, and other factors of the driver, the electro-optical apparatus, the liquid crystal panel, and the like are not limited to those described in the present embodiment, and various changes can be made thereto.

What is claimed is:

1. A driver configured to drive a liquid crystal panel, the driver comprising:

a first terminal to an n-th terminal electrically coupled to segment electrodes of the liquid crystal panel;

a first segment driving circuit to an n-th segment driving circuit configured to output a static-driving or duty-driving drive signal to the first terminal to the n-th terminal, wherein the first segment driving circuit to the n-th segment driving circuit are each configured to output the static-driving drive signal when the static driving is set, and output the duty-driving drive signal when the duty driving is set; and a data supplying circuit configured to supply each of the segment driving circuits with data including selection data set at an s-th bit and display data for duty driving or display data for static driving set at a t-th bit to a u-th bit.

2. The driver according to claim 1, wherein the data supplying circuit is configured to supply each of the segment driving circuits with the display data, and the selection data based on which the static driving or the duty driving is selected.

3. The driver according to claim 2, wherein the segment driving circuits are each configured to output the static-driving drive signal when the static driving is selected based on the selection data, and output the duty-driving drive signal when the duty driving is selected based on the selection data.

4. The driver according to claim 1, wherein the segment driving circuits are each configured to output the static-driving drive signal in synchronization with a frame signal for static driving when the static driving is selected, and the duty-driving drive signal in synchronization with a frame signal for duty driving when the duty driving is selected.

5. The driver according to claim 1, wherein the segment driving circuits each include a static-driving circuit configured to output the static-driving drive signal, a duty-driving circuit configured to output the duty-driving drive signal, and an output circuit configured to output the static-driving drive signal when the static driving is selected and output the duty-driving drive signal when the duty driving is selected.

6. The driver according to claim 1, further comprising:

a common driving circuit for static driving configured to output a common signal for the static-driving; and a common driving circuit for duty driving configured to output a common signal group for the duty-driving.

7. The driver according to claim 6, further comprising:

a common terminal for static driving via which the common signal for the static-driving is output; and a common terminal group for duty driving via which the common signal group for the duty-driving is output.

8. The driver according to claim 7, wherein the first terminal to the n-th terminal include a p-th terminal to a q-th terminal and a (q+1)-th terminal to an r-th terminal, and the common terminal for the static driving and the common terminal group for the duty driving are disposed between the q-th terminal and the (q+1)-th terminal.

9. The driver according to claim 1, wherein the first terminal to the n-th terminal are arranged along a side of the driver.

10. An electro-optical apparatus comprising:

the driver according to claim 1; and the liquid crystal panel.

* * * * *